INVENTOR
WILLIAM G. CROUSE

BY John C Black

ATTORNEY

March 11, 1969 W. G. CROUSE 3,432,616

DATA TRANSMISSION APPARATUS UTILIZING FREQUENCY SHIFT KEYING

Filed April 15, 1965 Sheet 3 of 11

March 11, 1969 W. G. CROUSE 3,432,616

DATA TRANSMISSION APPARATUS UTILIZING FREQUENCY SHIFT KEYING

Filed April 15, 1965 Sheet 7 of 11

United States Patent Office 3,432,616
Patented Mar. 11, 1969

3,432,616

DATA TRANSMISSION APPARATUS UTILIZING FREQUENCY SHIFT KEYING

William G. Crouse, Endwell, N.Y., assignor to International Business Machines Corporation, Armonk, N.Y., a corporation of New York Filed Apr. 15, 1965, Ser. No. 448,521

U.S. Cl. 178—66 24 Claims

Int. Cl. H01l 27/12

ABSTRACT OF THE DISCLOSURE

A frequency modulated keying transmitter comprises a triangular waveform modulator, the frequency of which depends solely upon the resistors and capacitor of a parallel voltage divider-integrator circuit. A differential amplifier which responds to the divider-integrator voltages and a high speed switch which applies one or the other of two charge potentials to the divider-integrator cause the integrator to charge positively and negatively about an average potential level.

Means including a pair of oppositely poled diodes translate the triangular waveform into sinusoidal signals. Since tuned circuits are not used, the signals can be turned off rapidly and changed in frequency without ringing.

A linear shunt feedback amplifier having a low output impedance in the order of 1 ohm drives the output transmission line by way of a very low inductance transformer without degeneration in low frequency response characteristics. High-valued resistors couple the transformer secondary winding to the line.

The drive amplifier also serves as an input amplifier for signals received over the line from other transmitters.

This application is directed generally to improved transmitting and receiving apparatus of the type utilizing frequency shift keying techniques.

Certain of the circuits shown in FIG. 2*b* are shown and claimed in copending U.S. application of William G. Crouse, the applicant herein, Ser. No. 426,847, filed Jan. 21, 1965, issued on Oct. 31, 1967, as U.S. Patent No. 3,350,575 for "Application of Triangular Waveforms to Exponential Impedance Means To Produce Sinusoidal Waveforms."

Certain of the circuits shown in FIGS. 7, 11 are shown and claimed in copending U.S. application of Ivars G. Akmenkalns, Ser. No. 362,716, filed Apr. 27, 1964, issued as U.S Patent No. 3,382,378, and assigned to the assignee of the present application.

The subject matter of the copending applications is set forth more fully in the detailed description.

In apparatus of this type, many serious problems have been encountered, some of which have not been solved without resorting to extremely expensive circuits.

The data transmitter sends binary data over the line at one or the other of two frequencies. One particularly troublesome problem has been the design of a sine wave producing apparatus at low cost with extremely accurate frequency control, with the ability to change the frequency rapidly and accurately and without distortion, and with the ability to very rapidly stop the sine wave signals, preferably at the same point in the cycle of operation of the sine wave producing apparatus.

Accordingly, one of the primary objects of the present invention is the provision of an economical means for producing sine wave signals, the frequency of which is accurately controlled.

It is another object of the present invention to provide sine wave producing apparatus of the type set forth in the preceding object which can be changed rapidly from one frequency to another without distortion and which can be turned off rapidly at a predetermined point in the cycle of operation.

These objects are achieved in a preferred embodiment of the invention by the provision of a triangular waveform generating modulator, the frequency of which is dependent solely upon the resistors and capacitor of a voltage divider and an integrator. The voltage divider and integrator are operated in parallel by a high speed switch which applies one and then the other of two bivalued voltages to their inputs. A high speed differential amplifier controlled by the integrator-divider outputs controls the state of the switch.

When the bivalued voltage is changed from one level to the other by the switch, the output of the voltage divider is immediately switched from one to the other of two voltage levels, whereas the output of the integrator charges toward the new level of the voltage divider output in accordance with its time constant. When the integrator output level reaches the voltage divider output level, the differential amplifier becomes effective to cause the switch to again change the voltage level applied to the inputs of the voltage divider and integrator, thus completing one half cycle of operation.

The integrator output then charges to the new output level of the voltage divider to complete the other half cycle of operation.

The change in charge on the capacitor is maintained to a small percentage of the total value to produce an integrator output voltage with equal positive and negative linear slopes. The frequency is independent of power supply levels and of the characteristics of the semiconductor elements used in the switch and in the differential amplifier.

The output of the integrator is applied to a nonreactive filter comprising a pair of oppositely poled diodes. The current-voltage time characteristics of the diodes are utilized to produce a sine wave current signal in response to the triangular voltage signal. This current signal is suitably amplified and applied to the transmission line. The modulator can be stopped instantaneously since it does not include a resonant circuit; and, since the filter is non-reactive, there is no ringing when the modulator is turned off.

Means controlled by the output of the filter control the turn-off of the modulator at a desired instant in the cycle of operation.

Another problem which has existed in the area of transmitting and receiving apparatus is that of the relatively costly line driver and terminator apparatus including a bulky transformer which is difficult to package in the environment of modern apparatus utilizing solid state devices. An improved line-transformer coupling arrangement is provided, wherein the impedance presented to the transmission line is essentially that of a high valued resistance means in series with a low inductance transformer, rather than a high inductance transformer.

Accordingly, it is an object of the present invention to provide an improved, transmission line-transformer-transmitting apparatus coupling circuit.

With this coupling arrangement it is now possible to utilize an improved, low cost, easily packaged transformer-single amplifier combination for both driving and terminating the line. Since the transformer impedance is low, the driver output and receiver input impedances can be made very low; e.g., as low as one or a few ohms. Shunt feedback amplifiers have both low input and low output impedances. A linear shunt feedback amplifier, which acts as both a drive amplifier and a receiving amplifier, is therefore incorporated in the preferred embodiment.

Accordingly, it is a primary object of the present invention to provide in frequency shift keying apparatus, or the like, an improved driver-terminator circuit including a low cost, compact and easily packaged transformer and a single amplifier.

Another problem which has existed is that of designing apparatus which can reliably distinguish between noise and data signals with signal-to-noise ratios closely approximating unity.

Accordingly, it is a primary object of the present invention to provide an improved threshold circuit which reliably distinguishes between signals which are at or a very small amount below a predetermined threshold.

The latter object is achieved in a preferred embodiment of the invention by means of a shunt feedback amplifier wherein the shunt feedback circuit includes nonlinear elements such as diodes, which provide extremely high amplifier gain only in a small precisely defined region between two adjacent regions of low gain. The threshold is set within the region of high gain to provide a very high degree of discrimination between signal levels below and above the threshold.

In addition, the preferred embodiment includes a bistable Schmitt trigger having a hysteresis characteristic, the hysteresis thresholds being exceeded only by output signals from the shunt feedback amplifiers which have entered the high gain region and reach the threshold level therein.

Another object of the present invention is the provision of an improved discriminator and detector circuit for producing bivalued output signals in accordance with the high and low carrier signals representative of logical "0" and logical "1" data bits.

It is another object of the present invention to provide an improved delay circuit which provides exactly equal time delays of both the positive and negative-going changes in the bivalued data signals applied thereto.

The foregoing and other objects, features and advantages of the invention will be apparent from the following more particular description of preferred embodiments of the invention, as illustrated in the accompanying drawings.

Figure 1:
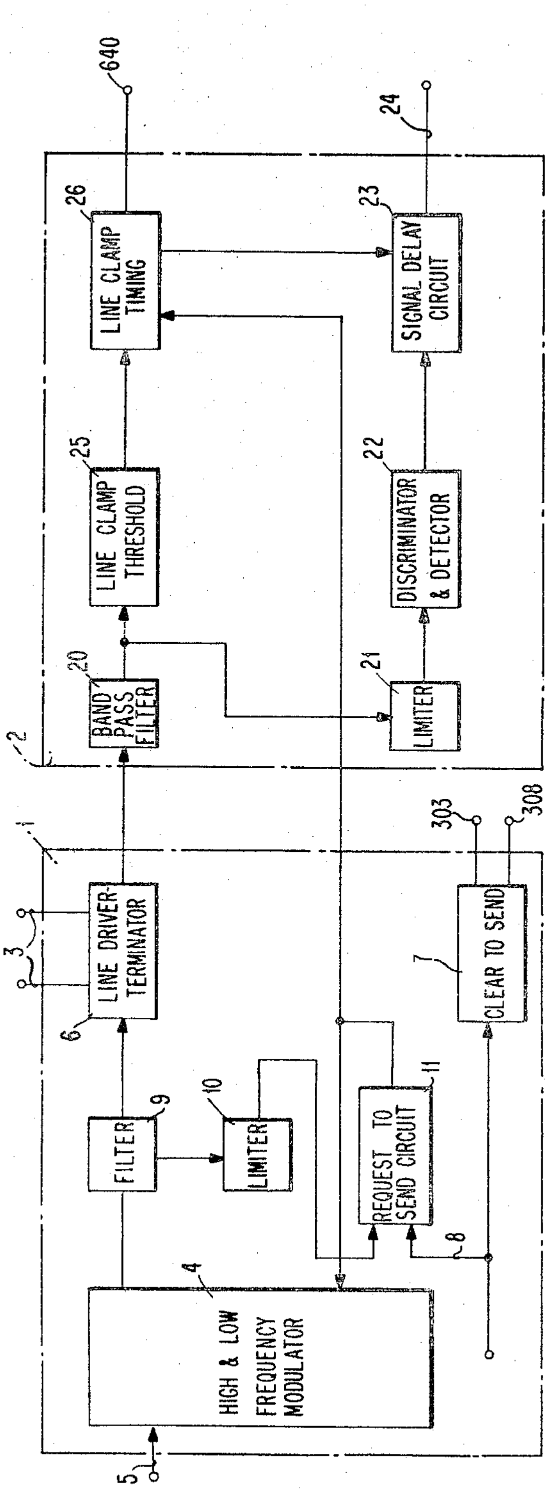
Figure 3:
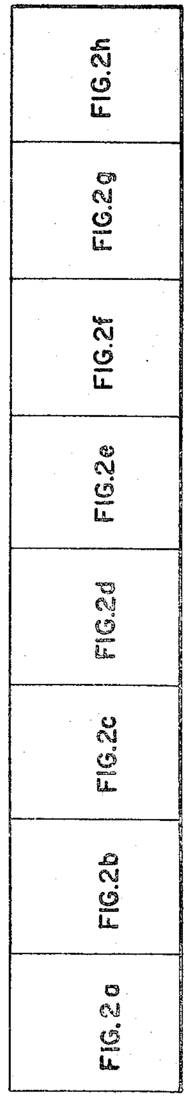
FIG. 3 illustrates the organization of FIGS. 2*a*–2*h*, inclusive.

In the drawings:

FIG. 1 is a diagrammatic view of the improved transmitting and receiving apparatus of the present application;

FIGS. 2*a*–2*h*, inclusive, are a schematic diagram of a preferred embodiment of the improved transmitting and receiving apparatus of the present application;

Transmitting-receiving system of FIG. 1

The improved apparatus of FIG. 1 includes a transmitting unit 1 and a receiving unit 2 which are connected to a transmission line 3.

The transmitting unit 1 includes a modulator (or oscillator) 4 which, under the control of bivalued data signals received over a SEND DATA line 5, transmits data in the form of one or the other of two frequencies over the transmission line 3 by way of line driver-terminator 6. It will be assumed that the higher and lower frequencies represent logical "0" and "1" data bits respectively.

The receiving and transmitting units 1 and 2 of FIG. 1 are normally associated with local data processing apparatus (not shown) of the type which includes means for storing data intended for transmission to remote locations and for storing data received from remote locations together with the required controls for transmitting and receiving data.

These controls include a REQUEST SEND line 8 which is energized when it is desired to transmit information. The line 8 is connected to a REQUEST SEND circuit 11 which starts the modulator 4 and to an incoming CLEAR TO SEND circuit 7 which controls the data processing apparatus to permit the transmission of data from the data processing apparatus to the transmitting unit 1 only after a predetermined time delay. This time delay permits the modulator 4 to stabilize at a desired one of the two frequencies, for example, the lower frequency. Data is transmitted from the storage means of the data processing apparatus by way of the SEND DATA line 5; and this line is held at the logical "1" level when data is not being sent.

The output of the modulator 4 is connected to a filter 9. The modulator signals are of a triangular waveshape and are changed to sinusoidal signals by the filter. The output of the filter 9 is in turn connected to the line driver-terminator 6. The output of the filter is also connected to a limiter 10 which, together with the REQUEST SEND signal on the line 8, controls the REQUEST SEND circuit 11 to turn off the oscillator when all of the data of a message has been transmitted.

The receiving unit 2 includes a band-pass filter 20 which substantially attenuates noise signals having frequencies substantially above and below the two data transmitting frequencies. The output of the band-pass filter is connected to a limiter 21 which provides very high gain to low amplitude signals and substantially limits the amplitude of relatively high amplitude signals. By reason of the very high gain in the limiter and the limiting action therein, only the strongest signal is passed through the limiter. During the reception of data, the data signals are almost invariably the strongest signals present, whereby the data signals pass through the limiter and noise signals are substantially eliminated.

The output of the limiter 21 is applied to a frequency discriminator and detector circuit 22. The circuit 22 responds to data signals in the form of an alternating current carrier at one or the other of the two frequencies to produce a direct current output voltage which is at one or the other of two voltage levels representative of a logical "1" or a logical "0" data bit.

The output of the frequency discriminator 22 is applied to a time delay circuit 23, the output 24 of which is alternatively at one or the other of two voltage levels representative of a logic "1" or a logic "0" data bit, to couple data from the frequency discriminator and detector circuit 22 to the data processing appaartus.

However, in the course of coupling the data from the circuit 22 to the data processing apparatus, the circuit 23 delays the transmission of the data for a predetermined time interval. This delay is required because the limiter 21 has such a high gain at very low input amplitudes that it is capable of amplifying signals, which were substantially attenuated by the filter 20, to the point where they occasionally could be detected as data signals. This can occur only when data signals are not present.

Hence, means must be provided to determine whether the signals represent data or noise; and, in the event that no date is present, this means must prevent the output of the discriminator and detector circuit 22 from being applied to the output line 24. Hence, the delay circuit 23 provides a time delay to permit the determination of the presence or absence of data.

More specifically, the output of the band-pass filter 20 is coupled to a line clamp threshold circuit 25 which determines whether incoming signals received by the driver-terminator 6 and passing through the band-pass filter 20 are of sufficient amplitude to be recognized as data pulses.

In the specific embodiment, the amplitude at which the decision is made that the signal is data is extremely accurate and precise. The circuit 25 is designed such that the signal-to-noise ratio can be very close to "1" with reliable discrimination between noise and data. The input circuit to the line clamp threshold is preset for a precise threshold value with assurance that signals, which are a very small increment below the threshold will be rejected as noise; and signals which are an insignificant increment above the threshold will be accepted as data.

The output of the line clamp threshold circuit 25 is coupled to a line clamp timing circuit 26 which together with the circuit 25 controls the output of the timing circuit 23 so as to force the output 24 to a logic "1" level when data is not present, thereby preventing the transmission of erroneous data to the data processing apparatus. A first time delay means in the circuit 26 responds instantly to input signals and provides a turn-off delay in the order of approximately one-half the cycle time of the lower frequency.

A second time delay means in the circuit 26 responds instantly to the first delay means when the latter goes to the "no signal" level, to clamp the output line 24 to the logical "1" state. However, the second delay means removes the clamp only a predetermined time interval after the first delay means goes to the "signal" level. This second delay means rejects noise signals of high amplitude and short time duration and rejects turn on transients of the modulator. The second delay means also responds to the circuit 11 when the modulator 4 and is turned off to instantly apply the clamp to the output line 24.

The delay of the first delay means controls the delay circuit 23 to force the output 24 to said logic "1" condition at the termination of input data. The second delay means removes this "clamp" a short time after data signals are received.

It will be recalled that the delay circuit 23 delays the transmission of data from the frequency discriminator 22 to the output terminal 24 for a predetermined time period. This time period is selected to be longer than the time required for the first delay means of the line clamp timing circuit 26 to become effective to force the output to a logic "1" condition, thereby preventing the transmission of data.

It will be also recalled that, when the REQUEST SEND circuit 11 was energized to start the modulator 4, the CLEAR TO SEND circuit 7 prevents the transmission of data from the data processing apparatus to the modulator for a predetermined time interval, for example, seven milliseconds; and the modulator 4 operates at the logic "1" or low frequency rate.

The first and second delay means of the line clamp timing circuits of the receivers of the local and remote stations on the line 3 will respond to the logical "1," low frequency output of the oscillator 4; and, within the delay time of the second delay means, the remote receivers will be ready to receive data.

It will be noted that the logical "1" signal can be applied to the line 24 when data is not being received because the present apparatus has been adapted for use in systems wherein each character is transmitted in the form of a plurality of binary bits, together with a logical "0" start bit and a logical "1" end bit. Thus, with the line normally at the logical "1" condition, the first logical "0" is the first bit of each character.

The detailed circuits of FIGS. 2*a*–2*h*, inclusive, will now be described in detail.

Figure 2A:
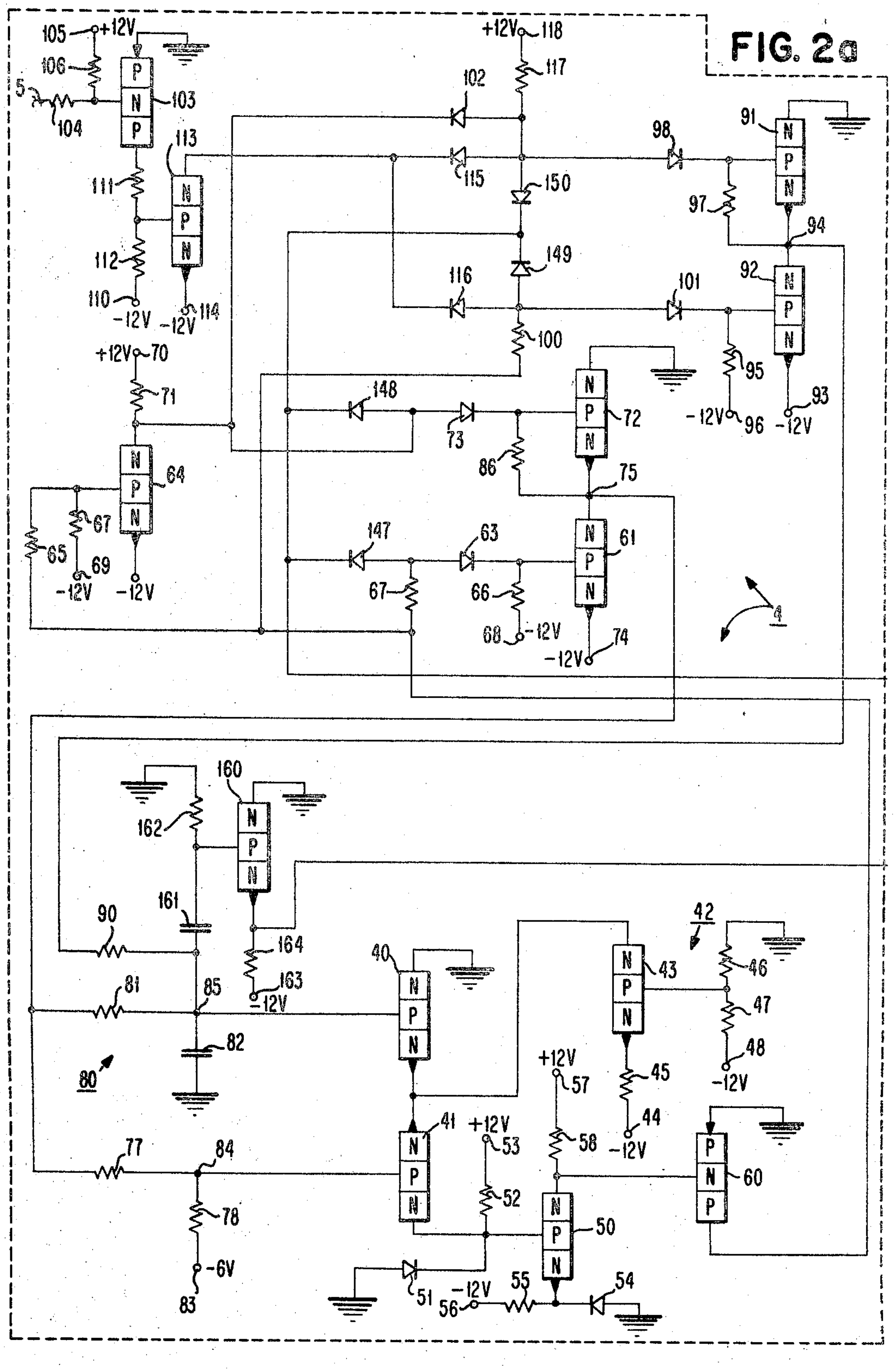

Modulator 4—FIG. 2*a*

The modulator 4 is shown in FIG. 2*a* and includes a differential amplifier comprising a pair of transistors 40 and 41, the emitters of which are connected together and to a constant current source 42. The constant current source includes a common base transistor 43, the emitter electrode being connected to a negative supply terminal 44 by way of a resistor 45. The base electrode of the transistor 43 is connected to the junction of a pair of series-connected resistors 46 and 47, one of which is connected to ground potential and the other being connected to a negative supply terminal 48.

The collector terminal of the transistor 40 is connected to ground potential and the collector terminal of the transistor 41 is connected to the base electrode of a transistor switch 50. The collector electrode of the transistor 41 is also connected to a clamping diode 51, which limits the negative excursion at the collector electrode, and to a resistor 52 which, together with a positive supply connected to the terminal 53, provides an input threshold current for the transistor switch 50.

The emitter electrode of the transistor 50 is connected to the junction between a series-connected diode 54 and resistor 55. The resistor 55 is connected to a negative supply terminal 56 and the diode 54 is connected to ground potential. The collector electrode of the transistor 50 is connected to a positive supply terminal 57 by way of a resistor 58 and is also connected to the base electrode of a transistor switch 60.

The emitter-electrode of the transistor 60 is connected to ground potential. The negative voltage developed across the diode 54 assures a sufficiently negative potential at the collector electrode of the transistor 50 to turn on the transistor 60 when the transistor 50 is turned on.

The collector electrode of the transistor 60 is connected to the base electrode of a switching transistor 61 by way of a resistor 62 and a diode 63 and is also connected to the base electrode of a second switching transistor 64 by way of a resistor 65. A pair of resistors 66 and 67, which are connected to negative supply terminals 68 and 69, assure turn off of the transistors 61 and 64, respectively, when the transistor 60 is turned off.

The collector electrode of the transistor 64 is connected to a positive supply terminal 70 by way of a resistor 71 and is also connected to the base electrode of a switching transistor 72 by way of diode 73. The collector electrode of the transistor 72 is connected to ground potential and the emitter electrode of the transistor 61 is connected to a negative supply terminal 74. The emitter electrode of the transistor 72 is connected to the collector electrode of the transistor 61.

As will be seen in greater detail below, the transistors 61 and 72 are both turned off when the modulator 4 is not operating. When the modulator is operating at either of the two frequencies at which it can be operated, one or the other of the two transistors 61 and 72 will be energized to saturation and the other will be turned off. That is, during operation of the modulator 4, the transistors 61 and 72 are turned on and off cyclically at the frequency of the oscillator. More particularly, when the transistor 60 is energized, it applies a sufficiently positive potential to the base electrodes of the transistors 61 and 64 to energize the latter transistors. The transistor 64, when it becomes energized, turns off the transistor 72. When the transistor 60 is turned off, the negative supply potential applied to the base electrodes of the transistors 61 and 64 by way of the resistors 66 and 67 turn the latter transistors off. When the transistor 64 is turned off, its collector bias circuit turns on the transistor 72.

Since the collector electrode of the transistor 61 and the emitter electrode of the transistor 72 are connected together, the junction 75 between the electrodes is forced to approximately ground potential when the transistor 72 is turned on and is forced approximately to the negative supply potential of the terminal 74 when the transistor 61 is turned on.

The junction 75 is connected to the input terminals of a voltage divider 76 comprising a pair of resistors 77 and 78 and an integrator 80 including a resistor 81 and a capacitor 82. The resistor 78 is connected to a negative supply terminal 83 which is equal in value to half the value of the potential at the supply terminal 74. Since the junction 75 swings in potential between ground potential and the potential at the terminal 74, the voltage at the junction 84 between the resistors 77 and 78 will swing a predetermined value above and below the voltage applied to the terminal 83. The relative values of the resistors 77 and 78 determine the voltage swing at the junction 84.

The voltage at the junction 85 between the resistor 81 and the capacitor 82 of the integrator circuit will vary about the voltage level at the terminal 83, reaching peak-to-peak amplitudes substantially equal to the peak-to-peak amplitudes at the junction 84. The total voltage swing at the junctions 84 and 85 are held to a small percentage of the capacitor charging voltage swing at the junction 75 so that the slope of the voltage swing at the junction 85 is substantially linear, thereby producing a generally triangular waveform with equal positive and negative linear slopes.

As indicated above, it is desired that the slope of the charge characteristic of the capacitor 82 be maintained constant; and, therefore, it is necessary to limit the amount that the capacitor is charged to a very small percentage of the total amount to which it could be charged by the source at the junction 74. Since the voltage at the junction 75 varies between ground potential and −12 volts, the capacitor 82 could charge toward ground potential and toward −12 volts on each half cycle, unless prevented by some control means.

In order to maintain the change in voltage substantially constant with respect to time, the maximum change in voltage will be held in the illustrated embodiment to approximately four-tenths volt on either side of the reference voltage or a maximum swing of eight-tenths volt. This is approximately 12 percent (12%) of the total possible change and provides a sufficiently linear charge characteristic. It will be appreciated that this value is given by way of example only.

The voltage at the junction 85 swings above and below the negative 6 voltage reference potential an amount determined by the swing in potential at the junction 84 when the voltage at the junction 75 is switched between ground potential and −12 volts. The values of resistors 77 and 78 determine the voltage level at the junction 84 and are therefore selected to establish levels which are four-tenths volt above and below the reference potential of −6 volts.

With the voltage at the junction 85 more negative than that at the junction 84, the transistor 40 is turned off and the transistor 41 is turned on. With the junction 85 more positive than junction 84, the transistors 40 and 41 are on and off respectively.

The operation of the modulator 4 will now be described in more detail.

Assume, for purposes of illustration, that the transistor 61 is cut off and that the transistor 72 is turned on. The voltage at the junction 75 is at ground potential. The potential at the junction 84 is at its most positive level. The potential at the junction 85 will be swinging from its most negative level toward its most positive level. Transistors 40, 41 and 50 will be off, on and off respectively. As the voltage at the junction 85 approaches the more positive potential level at the junction 84, the current from the source 42 will start to divide between the transistors 40 and 41. As soon as the current in the transistors 40 and 41 becomes approximately equal, the transistor 50 will be switched on to turn on the transistor 60. In turning on, the transistor 60 will turn on the transistors 61 and 64. The transistor 64 will turn the transistor 72 off, whereby the voltage at the junction 75 will be switched from ground potential to −12 volts. The voltage at the junction 84 will be instantaneously switched to its more negative value whereby the transistor 41 will be fully cut off and all of the current from the source 42 will flow through the transistor 40.

At this point, one half cycle of operation has occurred and the voltage at the junction 85 will now decrease toward its more negative value to start the second half cycle of operation. When the voltage at the junction 85 becomes substantially equal to or slightly more negative than the voltage at the junction 84, the current from the source 42, which will have started to divide between the transistors 40 and 41, becomes sufficiently high in the transistor 41 to turn the transistor 50 off. The transistors 60, 61 and 64 turn off, and the transistor 72 turns on to apply ground potential to the junction 75. This completes one full cycle of operation.

In the preferred embodiment, the modulator 4 is operated at the higher of its two frequencies by connecting a resistor 90 in parallel with the resistor 81 to charge the capacitor 82 at a faster rate. An additional switch comprising transistors 91 and 92 is provided for supplying charge current to the capacitor 82 through the resistor 90. The collector electrode of the transistor 91 is connected to ground potential, the emitter electrode of the transistor 92 is connected to a negative supply terminal 93, and the emitter electrode of the transistor 91 and the collector electrode of the transistor 92 are connected to a junction 94.

A resistor 95 connected between the base electrode of the transistor 92 and a negative supply terminal 96 provide cut off bias for the transistor 92. A resistor 97 connected between the base and emitter electrodes of the transistor 91 assures turn-off of the transistor in the absence of positive input signals applied to its base electrode by way of a diode 98. When the transistor 91 is turned on, it applies ground potential to the junction 94, providing a positive charge current for the capacitor 82; and when the transistor 92 is turned on its applies negative potential to the junction 94.

The collector electrode of the transistor 60 is connected to the base electrode of the transistor 92 by way of a resistor 100 and a diode 101 so that the transistor 60 can turn on the transistor 92 whenever it turns on the transistor 61. The collector electrode of the transistor 64 is connected to the base electrode of the transistor 91 by way of a diode 102 and the diode 98 to turn the transistor 91 on and off at the same time that it turns the transistor 72 on and off.

The transistors 91 and 92 are rendered effective and ineffective, forcing the modulator into its high and low frequency modes respectively, under the control of bivalued data signals applied to the SEND DATA line 5. The line 5 is connected to the base electrode of a common emitter transistor switch 103 by way of a resistor 104. The base electrode of the transistor 103 is connected to a positive supply terminal 105 by way of a bias resistor 106. The collector electrode of the transistor 103 is connected to a negative supply terminal 110 by way of resistors 111 and 112, the junction between the resistors being connected to the base electrode of a transistor switch 113. The emitter electrode of the transistor 113 is connected to a negative supply terminal 114 and its collector electrode is connected to a pair of diodes 115 and 116.

When the transistor 113 is conducting in response to a negative logic "1" level on the line 5, it applies a negative potential through the diodes 115 and 116 to the input diodes 98 and 101 of the transistors 91 and 92 to force the latter transistors off irrespective of the conditions of the transistors 60 and 64. Thus this negative logic "1" input level forces the oscillator to operate at the lower frequency which is representative of a logic "1."

A resistor 117 connected to the junction between diodes 115 and 98 and to a positive supply terminal 118 provides the base bias supply for the transistor 91 when the transistors 103 and 113 are turned off.

When a positive or logic "0" input level exists on the SEND DATA line 5, the transistors 91 and 92 are rendered effective to force the modulator 4 to operate in its high frequency mode which is representative of the logic "0" condition.

Figure 2B:
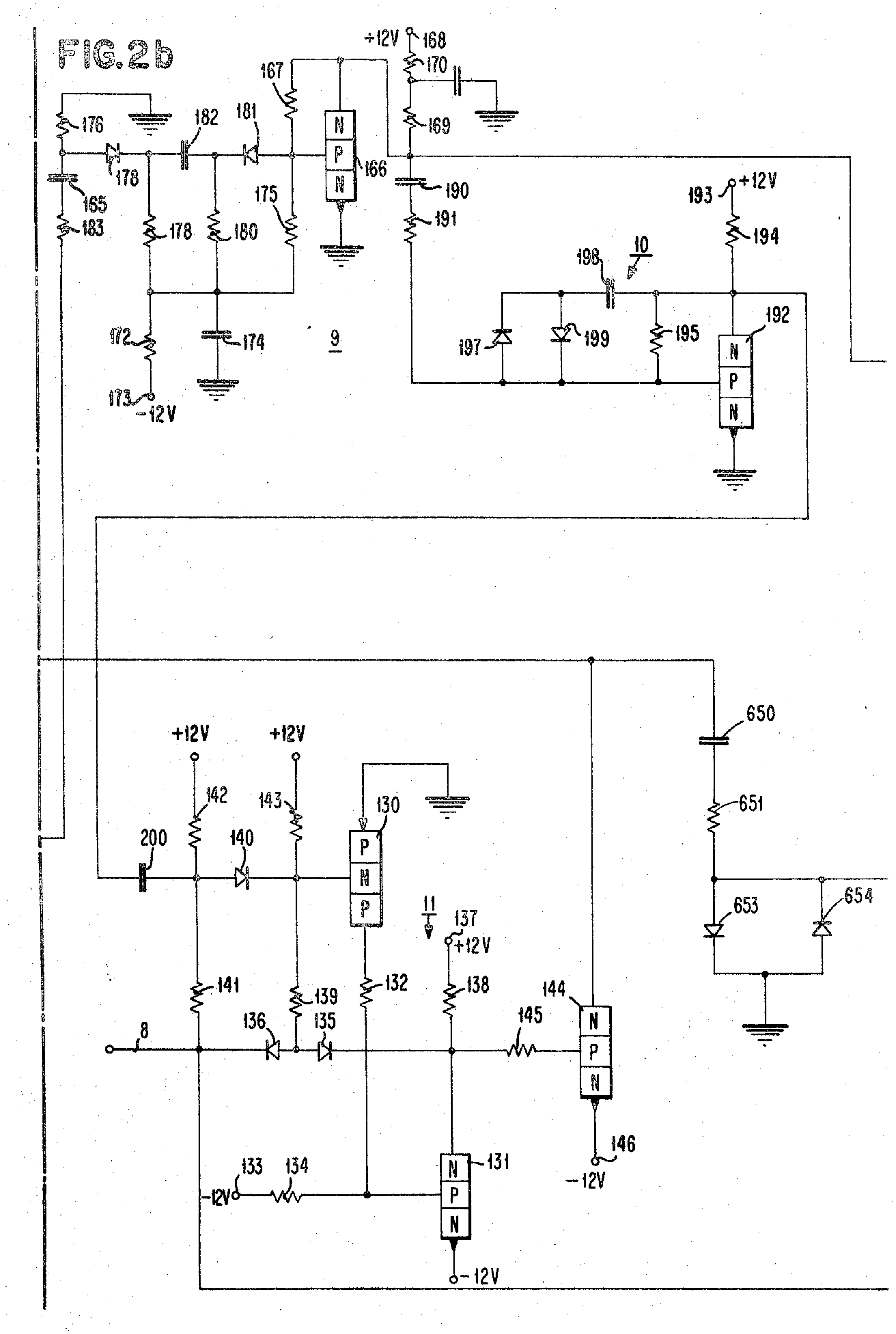

Request Send Circuit 11—FIG. 2*b*

The REQUEST SEND circuit 11 at the bottom of FIG. 2*b* responds to a negative going signal on the REQUEST SEND line 8 for turning the oscillator 4 on.

The circuit 11 includes a pair of transistors 130 and 131 connected as a bistable latch. The emitter electrode of the transistor 130 is connected to ground potential, and its collector electrode is connected to the base electrode of the transistor 131 by way of a resistor 132. The base electrode of the transistor 131 is also connected to a negative supply terminal 1?3 by way of a resistor 134. The collector electrode of the transistor 131 is connected to the line 8 by way of oppositely poled diodes 135 and 136, to a positive supply terminal 137 by way of a resistor 138, and to the base electrode of the transistor 130 by way of the diode 135 and a resistor 139.

The base electrode of the transistor 130 is connected to the line 8 by way of a diode 140 and a resistor 141. Base bias resistors 142 and 143 are connected to opposite terminals of the diode 140.

The collector electrode of the transistor 131 is connected to the base electrode of a transistor 144 by way of a coupling resistor 145. The emitter electrode of the transistor 144 is connected to a negative supply terminal 146, and its collector electrode is connected to the base electrodes of the transistors 61 and 72 by way of oppositely poled diodes 147, 63 and 148, 73. The collector electrode of the transistor 144 is also coupled to the base electrodes of the transistors 91 and 92 by way of oppositely poled diodes 149, 101 and 150, 98.

When a negative going signal is applied to the REQUEST SEND line 8, it is applied to the base electrode of the transistor 130 by way of the diode 136 and the resistor 139 to turn the transistor 130 on. In going on, the transistor 130 turns the transistor 131 on and the transistor 131 holds the transistor 130 on by way of the feedback circuit including the diode 135 and the resistor 139.

With the transistors 130 and 131 turned on, the transistor 144 will be turned off thereby removing the negative potential from the cathode of the diodes 147, 148, 149, and 150 to permit the operation of the transistors 61, 72, 91 and 92, thereby starting the modulator 4.

When it is desired to turn off the modulator 4 after the transmission of data, returning the input signal level on the REQUEST SEND line 8 to its more positive level will not reset the latch transistors 130 and 131. It is necessary that a positive pulse be applied to an input capacitor 200 after the line 8 is positive to reset the latch. This will be described below in conjunction with the description of the limiter 10.

Filter 9—FIG. 2*b*

The junction 85 of the integrator circuit 80 provides the output terminal for the modulator 4. The junction 85 is connected to the base electrode of an isolating drive transistor 160, connected as an emitter follower, by way of a coupling capacitor 161. The base electrode of the transistor 160 is connected to ground potential by way of a bias resistor 162. Its collector electrode is connected to ground potential and its emitter electrode is connected to a negative supply terminal 163 by way of a resistor 164.

The emitter electrode of the transistor 160 is also connected to the filter 9 by way of a coupling capacitor 165. The filter 9 is the subject matter of said co-pending U.S. application of William G. Crouse. The description of the abovesaid application is hereby incorporated herein by reference as if it were set forth in its entirety; and its design and operation will be set forth only briefly.

The filter 9 includes a shunt feedback, linear amplifier comprising a transistor 166 with a shunt feedback resistor 167 connected between the base and collector electrodes. The emitter electrode is connected to ground potential and the collector electrode is connected to a positive supply terminal 168 by way of a collector return resistor 169 and a resistor 170, which together with a capacitor 171 connected to ground potential, provides power supply filter means. A resistor 172 connected to a negative supply terminal 173 and a capacitor 174 connected to ground potential provide an additional power supply filter. A base bias resistor 175 is connected between said filter and the base electrode of the amplifier 166. Resistors 176 and 177 determine essentially the bias current through a diode 178. A resistor 180 determines essentially the level of the bias current through a diode 181. The cathode of the diodes 178 and 181 are coupled to each other by means of a low impedance capacitor 182.

The diodes 178 and 181, the capacitors 182 and 165, and an input resistor 183 form a series current path for coupling signals from the emitter electrode of the transistor 160 to the base electrode of the transistor amplifier 166, thereby coupling the output signals of the modulator 4 to the amplifier portion of the filter 9.

As the capacitor 82 of the modulator 4 charges linearly in positive and negative directions, the emitter follower 160 applies a generally triangular voltage waveshape to the filter 9. The voltage-current characteristic of the diodes 178 and 181 and the resistor 183 is such as to cause the input triangular voltage to produce a generally sinusoidal current of tht same frequency through the diodes and the capacitor 182. This sinusoidal current is applied to the linear amplifier 166 to produce a generally sinusoidal voltage output at the collector electrode thereof.

In this manner, the accurate frequency and rapid switching characteristics of the triangular waveform modulator 4 can be utilized to great advantage to produce equally accurate frequencies and rapid frequency changes in a sinusoidal output wavtform at low cost.

Limiter 10—FIG. 2*b*

The output of the filter 9 is connected to a limiter 10 by way of a coupling capacitor 190 and a resistor 191. The limiter 10 includes a transistor amplifier 192, the emitter of which is connected to ground potential and the collector of which is connected to a positive supply terminal 193 by way of a resistor 194. A resistor 195 is connected across the base-collector electrodes and biases the transistor at a desired, high gain operating level.

A pair of oppositely poled diodes 197 and 199 is connected in parallel between the base electrode and a capacitor 198 which is connected to the collector electrode. The diodes and the capacitor fgorm a variable impedance shunt feedback in the amplifier 192.

Low valued input signal levels which do not substantially change the high impedance characteristics of the diodes 197 and 199 are substantially amplified due to the high gain characteristics of the amplifier 192. However, as the amplitude of the input signal increases in a positive direction, the diode 197 becomes forward biased to its low impedance region to increase feedback and reduce the gain; and the signals are limited by the diode 197 by way of the capacitor 198. The negative half cycle of the input signal to the limiter 10 controls the impedance of the diode 199 to provide initial high gain, an exponentially decreasing gain and finally a limiting action.

The potential at the collector of the transistor 192 is close to a square waveform with the upper and lower limits defined substantially by the voltage drop across the diodes 197 and 199. Thus it can be seen that low level output signals from the transistor amplifier 192 have positive and negative swings substantially equal to the sum of the diode drops on the diodes 197 and 199 with very fast rise and fall times. These changes occur at the zero voltage crossover times of the output signals of the modulator 4 and the filter 9. These signals are applied to the REQUEST SEND circuit 11 by way of the coupling capacitor 200.

Assuming that it is desired to turn off the modulator 4 and that the REQUEST SEND line 8 has been driven positive. As indicated earlier, this does not reset the latch circuit comprising the transistors 130 and 131. However, this positive-going pulse will charge the capacitor 200. When the next succeeding positive-going edge of the signal output from the transistor amplifier 192 of the limiter 10 is applied to the capacitor 200, it will forward bias the diode 140 to turn off the transistor 130. The transistor 130 turns the transistor 131 off, thereby resetting the latch. The transistor 144 is again energized, thereby applying a negative potential from the terminal 146 through the transistor 144 to the diodes 147, 148, 149 and 150 to turn off the modulator 4.

Hence, the modulator is always turned off at the same part of a cycle. This is particularly important since it minimizes a serious problem exhibited in known apparatus. When an oscillator or modulator is turned off, they produce a turn off spectrum which at times is erroneously detected as data. By always stopping the oscillator at the same point in its cycle of operation, the turn off spectrum becomes relatively uniform, thus eliminating the chance of random errors which are difficult to find.

A sinusoidal oscillator or a non-sinusoidal oscillator whose output is filtered by a conventional filter is quite difficult to stop quickly and precisely since either approach tends to continue to ring when turned off. The circuit of this embodiment does not present this problem since the oscillator is not a resonant circuit and the filter does not use reactive elements to shape the signal. As a result the turn off delay through this filter is for all practical purposes zero. This allows the instant and precise turn off of the signal.

Figure 2C:
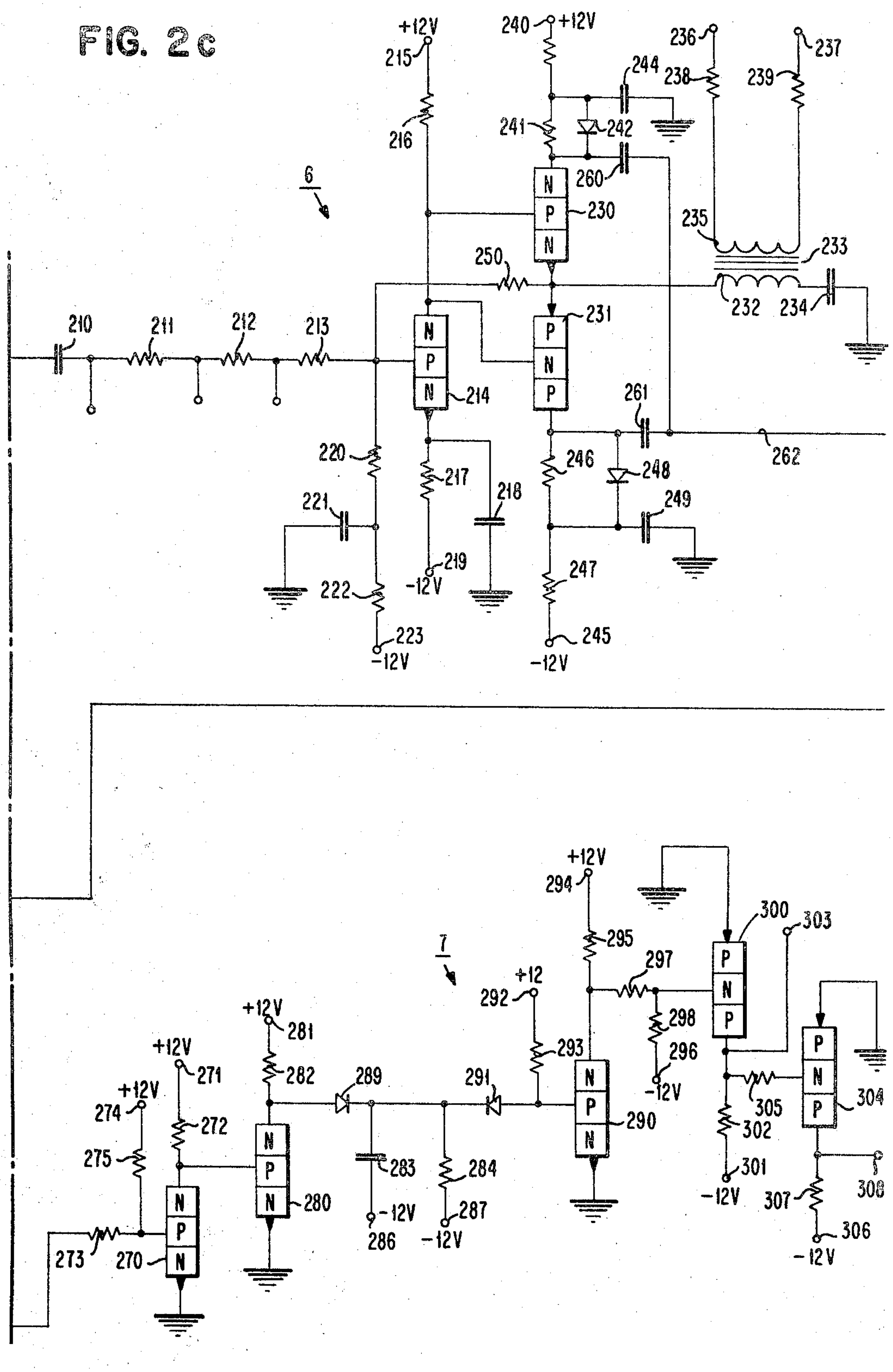

Driver-terminator circuit 6—FIG. 2*c*

The output of the filter 9 is also connected to the driver-terminator circuit 6 by way of a coupling capacitor 210 and resistors 211, 212 and 213.

The driver 6 comprises a linear amplifier with shunt feedback including a first transistor 214, the collector electrode of which is connectted to a positive supply terminal 215 by way of a resistor 216. A bias resistor 217 connects the emitter electrode to a negative supply potential to 19 and is bypassed by a capacitor 218. The base electrode of the transistor 214 is connected to a base bias resistor 220. The resistor 220 is connected to a supply filter including a capacitor 221 connected to ground potential and a resistor 222 connected to a negative supply terminal 223.

The collector electrode of the transistor 214 is connected to the base electrodes of a pair of complementary transistors 230 and 231, the emitters of which are connected to each other and to ground potential by way of a capacitor 234 and the primary winding 232 of a transformer 233. The secondary winding 235 of the transformer 233 is connected to a pair of terminals 236 and 237 of the line 3 by way of resistances 238 and 239.

The collector electrode of the transistor 230 is connected to a positive supply terminal 240 by way of resistor 241, a diode 242 and a resistor 243. A capacitor 244 connects a junction between the resistor 241 and 243 to ground potential. The resistor 243 and the capacitor 244 provide a supply filter.

The collector electrode of the transistor 231 is connected to a negative supply terminal 245 by way of resistors 246 and 247. A diode 248 is connected across the resistor 246 and a capacitor 249 is connected from ground potential to junction between the resistors 246 and 247. The resistor 247 and the capacitor 249 provide a supply filter.

The emitter electrodes of the transistors 230 and 231 are connected through a shunt feedback resistor 250 to the base electrode of the transistor 214. The voltage gain from the input capacitor 210 to the output terminal at the emitter electrodes of the transistors 230 and 231 is determined essentially by the ratio of the shunt resistance 250 to the input resistance to the base electrode of the transistor 214. Consequently, a plurality of resistors 211, 212 and 213 is provided so that the output voltage and power may be increased by shunting one or more of these resistors.

The transistors 214, 230 and 231 comprise a linear amplifier having second emitter to first base shunt feedback with complementary output transistors. The output impedance of the shunt feedback amplifier is extremely low so that a very low impedance is presented to the transformer 233 which couples the driver-terminator 6 to the transmission 3. It is particularly important that the driver-terminator 6 present a low impedance to the transformer 233 in order to obtain an optimum frequency response at low frequencies with the use of a low inductance transformer.

Known transmission line transformers are typically characterized by high inductance characteristics in order to achieve sufficient low frequency response. When several transmitting-receiving units are connected to a single transmission line, it is desirable to have the input impedance of the units considerably higher than the characteristic impedance of the line to avoid excessive signal attenuation. A typical input impedance value for a 600-ohm line is in the range of 4 to 10,000 ohms. Also, the inductive impedance of the transformer must be considerably higher than the resistance impedance desired looking into the transmission unit to insure efficient coupling, especially at the lowest frequencies.

This impedance is the total impedance seen looking in from the line, which includes, in the case of the preferred embodiment, resistors 238 and 239 and the impedance seen looking into the transformer itself. This latter impedance is small compared to that of the resistors 238 and 239.

In order to obtain a sufficiently low frequency response when working through a transformer, the inductive impedance of the transformer must be considerably higher than the resistance impedance presented across the primary and secondary windings of the transformer, the inductive impedance being the impedance at the lowest data frequency.

A suitable minimum value for the inductive impedance is about five to ten times the value of the resistive impedance.

In conventional circuits, one winding of the transformer is connected directly across the line. The other winding of the transformer is connected to the driver amplifier and the receiver amplifier, these normally being two separate circuits. Since the resistive impedance, looking into the transformer, is almost entirely a function of the impedance of the driver and receiver amplifiers, then the paralleled input impedance of the receiving amplifier and output impedance of the driver would have to be in the order of four thousand ohms, assuming a turns ratio of 1:1 in the transformer. In this configuration, in order to maintain the low frequency response to be sufficient, it would be necessary to have a large transformer with high inductive impedance. A typical transformer having a sufficiently high inductance to satisfy these requirements is in the order of eight cubic inches. This transformer is difficult to package with solid state circuits due to its size and weight.

In the driver-terminator 6 of the present application, the four thousand ohms input impedance is provided by series resistance resistors 238 and 239, each of which is two thousand ohms. The impedance connected across the winding 232 side of the transformer is, as mentioned previously, extremely low, in the range of approximately one ohm. This impedance reflected to the line side of the transformer results in little increase in the total impedance seen from the line, whereby the total impedance is still approximately four thousand ohms. In this manner, the impedance presented across the transformer is considerably lower than the impedance in known devices.

Since the impedance across the transformer is considerably lower (by a factor of one to four thousand) than that of the transformer described above, it is then found that the inductance required in the transformer can be correspondingly less than that of the previously described transformer; i.e., in the order of one–four thousand to one. In the preferred embodiment, the full difference in inductances has not been taken advantage of, but rather the inductance was maintained somewhat higher than the minimum required inductance to improve the frequency response.

To explain the manner in which the inductance limits the low frequency response, we can visualize the equivalent circuit where, looking into the primary side or the line side of the transformer, the equivalent circuit is an inductance across the input terminals of the transformer, this inductance being the inductance looking into the transformer itself with no load on the secondary side of the transformer.

In shunt with this inductance is the resistive impedance which has a value equal to the resistance on the secondary side of the transformer, multiplied by the turns ratio squared, the ratio being the number of turns on the line side of the transformer divided by the number of turns on the other side of the transformer. In the preferred embodiment, this turns ratio is the square root of ten so that the impedance reflected to the line side of the transformer is approximately ten ohms.

In this equivalent circuit including a resistance shunted by an inductance, current which flows through the resistance results in an input current to the transmitting unit output-receiving unit input impedances. Current flowing through the inductor is current which is lost.

For this reason, it is desirable to have essentially all of the transmitted and received currents flow through the resistive impedance and as little as possible flow through the inductance. If the impedance of the inductor is high compared to the impedance of the resistor, we then meet this requirement. However, as we go to a lower frequency, we find that the impedance of the inductor decreases.

We therefore select the inductance such that its impedance at the lowest frequency of operation is considerably higher than that of the resistance, preferably by a factor of five to ten or greater. Since the reflected resistance is in the order of about ten ohms, then the inductance can be of a rather low value.

In the case of the conventional circuit described above, where the reflected impedance is in the order of four thousand ohms, the inductance must be considerably higher in order to maintain the same frequency response.

Typical transformers which provide good frequency response characteristics in the preferred embodiment are in the order of one-third to one-thirtieth cubic inch with much of the volume devoted to assuring mechanical securing of the winding leads. Hence, one of the advantages of driving the transformer with a low impedance is the decreased size and weight. Also, since the transformer is driven and terminated on the transmitting-receiving side by a low impedance, an improved linear shunt feedback amplifier can be utilized to perform the function of both driving and terminating the transformer.

In known systems having a high impedance on the transmiting-receiving side of the transformer, a shunt feedback stage cannot be used; and two separate circuits are used, one being a driver with a high output impedance and the other being a receiving amplifier with a high input impedance.

Being able to use a shunt feedback circuit to drive and terminate the transformer results in a relatively low-cost circuit with accurate and distortionless gain characteristics.

With no input signals applied to the coupling capacitor 210, the transistor 214 is operated at a desired level by means of its base bias circuit and the transistor 230 will be conducting at a very low level since its emitter electrode is coupled by the shunt feedback resistor 250 into the base bias circuit of the transistor 214. At this time, the transistor 231 will be cut off.

When a positive half cycle of input signal is applied to the coupling capacitor 210, it is amplified by the transistors 214 and 231 and applied in inverted form to the winding 232 and the capacitor 234. Thus a positive half cycle applied to the input coupling capacitor 210 will produce a corresponding half cycle of signal at the secondary winding 235 of the transformer 233 by way of the primary winding 232.

Similarly, a negative half cycle of an input signal applied to the capacitor 210 will be amplified by the transistors 214 and 230 and applied in inverted form to the winding 232 of the transformer 233. Thus a full cycle of input signal at the capacitor 210 produces a full cycle signal in the secondary winding 235. This signal is applied to the line 3 by way of the resistors 238 and 239.

In the preferred embodiment, the turns ratio of the winding 232 to the winding 235 is the square root of ten to one. Consequently, the gain in voltage from the winding 232 to the winding 235 is the square root of ten. This is particularly advantageous in coupling the signal to the line 3 because the signal from the secondary winding 235 must be applied to the two resistors 238 and 239 which are of a relatively high resistance in comparison with the characteristic impedance of the line 3. Thus it is desirable to develop a high voltage at the secondary winding 235 so that the current passing through the resistors 238 and 239 and through the line 3 to a remote driver-terminator will be at a sufficiently high level.

On the other hand, when signals are received over the line 3 from a remote location for application to the driver-terminator 6, the turns ratio is also advantageous since there will be a current gain in the order of the square root of ten to one from the winding 235 to the winding 232. The voltage developed across the terminals 236 and 237 in response to signals from a remote transmitter is applied to the high value resistors 238 and 239, thereby being converted essentially to a current signal. The voltage across the winding 235, as a result of these signals, is very low since its impedance is very low. Since the signal at this point is essentially a current signal, amplification of the current signal from the winding 235 to the winding 232 gives better current drive characteristics.

It is well known in the art that it is desirable, perhaps necessary, to drive amplifiers having a low input impedance. It is also known that the output impedance of a shunt feedback amplifier can be made very low. If we can design the shunt feedback amplifier, which we use to drive the line 3, so that current signals received from a remote unit can be applied to the output of the shunt-feedback amplifier for amplification and translation, only one amplifier is required and optimum drive characteristics are achieved in both the transmit and receive mode.

With no input signals to the driver-terminator 6 from the line 3, the transistor 214 is conducting, the transistor 231 is cut off, and the transistor 230 is conducting at a very low level, close to cutoff. A positive and negative half cycle of current signal produced in the secondary winding 232 in response to signals from the line 3 will drive first the transistor 231 into conduction and back to cutoff; and then the transistor 230 into conduction and back to its initial state. When the transistor 231 is turned on by the positive half cycle, a low level positive half cycle of voltage is produced at its collector electrode and is coupled to the line 262 by way of the capacitor 261. It will be noted at this time that the amplitude swing at the collector is at such a low level that the diode 248 is in its high impedance state. Similarly, the negative half cycle which turns on the transistor 230 produces a low level negative voltage pulse at the collector electrode of the transistor 260; and this pulse is coupled to the conductor 262 by way of the capacitor 260. The diode 242 is maintained in its relatively high impedance state since the voltage swing is relatively small.

The input signals applied to the capacitor 210 also drive the transistor 231 into conduction and back to cutoff and then the transistor 230 into conduction and back to its initial state. A positive voltage swing is produced at the collector electrode of the transistor 231 and then a negative voltage swing is produced at the collector of the transistor 230. These signal levels are of such high amplitudes as to drive the diodes 248 and 242 to their low impedance regions, whereby the amplitude of the voltage swings at the collector electrodes is limited. These limited signals are then applied to the conductor 262 by way of the capacitors 260 and 261.

Clear to send circuit 7—FIG. 2*c*

It will be recalled that, when the data processing apparatus associated with transmitting unit 1 desires to send information to a remote location and applies a signal to the REQUEST SEND line 8 to start the oscillator, the transmission of data must be prevented for a predetermined period of time which is longer than the time required for the signal on the transmission line to achieve a steady state condition and for the line clamp threshold and timing circuits of the receiving unit of a remote station to remove the line clamp condition.

This delay is provided by the CLEAR TO SEND circuit 7 shown at the bottom of FIG. 2*c*. This circuit includes a first transistor amplifier 270, the emitter of which is connected to ground potential and the collector of which is connected to a positive supply terminal 271 by way of a resistor 272. The base electrode of the transistor 270 is connected to the REQUEST SEND line 8 by way of a resistor 273. The base electrode is also connected to a positive supply terminal 274 by way of a bias resistor 275.

The collector electrode of the transistor 270 is connected to the base electrode of a second transistor amplifier 280, the emitter electrode of which is grounded; and the collector electrode of which is connected to a positive supply terminal 281 by way of a resistor 282. The collector electrode of the transistor 280 is connected by a diode 285 to a delay circuit comprising a capacitor 283 and a resistor 284. The capacitor 283 and the resistor 284 are connected to negative supply terminals 286 and 287.

The delay circuit is connected to the base electrode of a third transistor amplifier 290 by way of a diode 291. The base electrode of the transistor 290 is connected to a positive supply terminal 292 by way of a resistor 293; the emitter electrode is connected to ground potential; and the collector electrode is connected to a positive supply terminal 294 by way of a resistor 295.

The collector electrode of the transistor 290 is also connected to a negative supply terminal 296 by way of resistors 297 and 298. A junction between the resistors 297 and 298 is connected to the base electrode of a transistor 300, the emitter of which is connected to ground potential. The collector electrode of the transistor 300 is connected to a negative supply terminal 301 by way of a resistor 302 and the collector is also connected to the CLEAR TO SEND terminal 303. The collector electrode of the transistor 300 is connected to the base electrode of a transistor 304 by way of the resistor 305. The emitter electrode of the transistor 304 is connected to ground potential and the collector electrode is connected to a negative supply terminal 306 by way of a resistor 307. The collector terminal is also connected to the output terminal 308 which is the inverted CLEAR TO SEND signal.

Figure 2D:
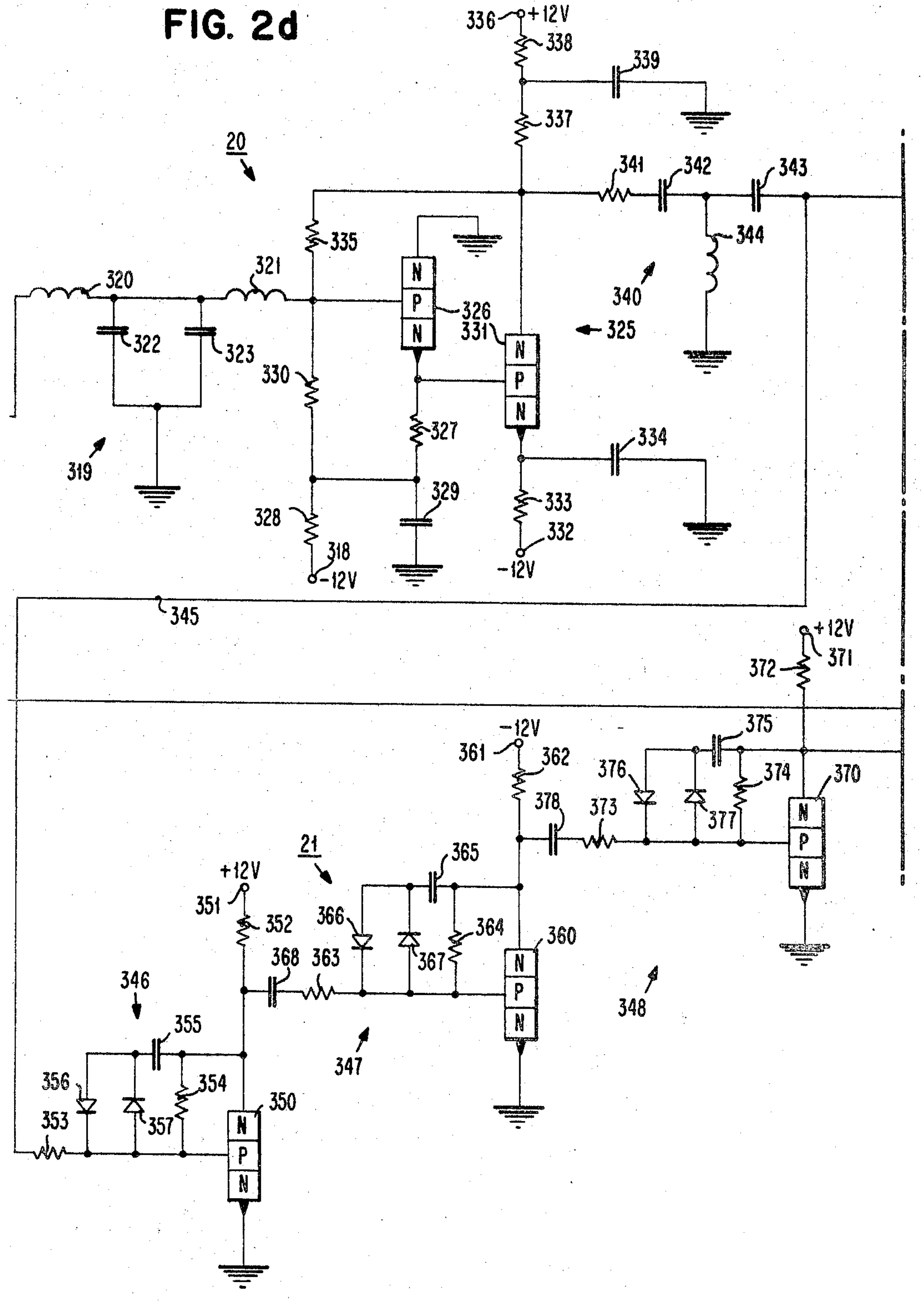

Band pass filter 20—FIG. 2*d*

The collector electrodes of the transistors 230 and 231 of the driver-terminator 6 are connected to the band pass filter 20 by way of capacitors 260 and 261 and the conductor 262.

The band pass filter 20 includes a low pass filter 319 having a pair of series-connected inductors 320 and 321 and a pair of capacitors 322 and 323. In the preferred embodiment, the values of the inductors and capacitors of the band pass filter 319 are selected to pass with little attenuation only those frequencies which are below 2500 cycles per second.

Normally relatively expensive, large high Q inductors are used in filter circuits, Q being the inductive impedance divided by the resistance at a selected frequency. It has been found that a low Q (i.e. high resistance) inductor may be utilized to achieve a significant cost and size savings when it is external to the filter, that is, the inductor and only the inductor is connected to one of the terminating impedances. This is possible since in effect its internal resistance becomes part of the terminating impedance and the inductor performs as if it were an infinite Q inductor. Hence, inherently low Q inductors 320 and 321 have been used to obtain results normally obtained with inherently high Q inductors.

The output of the low pass filter 319 is connected to the input to a linear amplifier 325 with shunt feedback. The amplifier 325 includes a first transistor 326 having its collector electrode connected to ground potential and its emitter electrode connected to a negative supply terminal 318 by way of resistors 327 and 328. A capacitor 329 connects the junction between the resistors 327 and 328 to ground potential. The resistor 328 and the capacitor 329 form a power supply filter. A bias resistor 330 is connected between the base electrode of the transistor 326 and the junction between the resistors 327 and 328.

The emitter electrode of the transistor 326 is connected to the base electrode of a transistor 331, the emitter electrode of which is connected to a negative supply terminal 332 by way of a resistor 333. The emitter electrode is also connected to ground potential by way of a capacitor 334. A shunt feedback resistor 335 is connected between the collector electrode of the transistor 331 and the base electrode of the transistor 326. The collector electrode of the transistor 331 is connected to a positive supply terminal 336 by way of resistors 337 and 338. The junction between resistors 337 and 338 is connected to ground potential by way of a capacitor 339. The capacitor 339 and the resistor 338 provide a power supply filter.

The collector electrode of the transistor 331 is connected to a high pass filter 340 by way of a resistor 341. The high pass filter includes a pair of series-connected capacitors 342 and 343 and an inductor 344 connected from the junction between the capacitors to ground potential. In the preferred embodiment, the values of the capacitors 342 and 343 and the inductor 344 are selected so as to pass frequencies above 700 cycles per second with little attenuation.

It will be recalled that the low pass filter 319 substantially attenuated frequencies above 2500 cycles per second and that the high pass filter 340 substantially attenuated signals below 700 cycles per second. As a result, the band pass filter 20 will pass only those frequencies between 700 cycles per second and 2500 cycles per second without substantial attenuation.

Limiter 21—FIG. 2*d*

The band pass filter 20 has its output coupled to the input of a three stage limiter 21 by way of a conductor 345. Each of the three stages 346, 347 and 348 of the limiter 21 is preferably similar to the limiter 10 described above; and each is effective to provide high amplification of low level signals and limiting of high level signals to produce substantially square wave output signals of substantially the same amplitude in response to input signals, the amplitude of which may vary as much as 50:1 or greater.

The first stage is a shunt feedback amplifier including a transistor 350, the emitter of which is connected to ground potential and the collector of which is connected to a positive supply terminal 351 by way of a resistor 352. Signals on the input conductor 345 are connected to the base electrode of the transistor 350 by way of a resistor 353. A bias resistor 354 is connected between the base and collector electrodes of the transistor 350 to energize the transistor at the desired operating level. A feedback circuit comprising a capacitor 355 and a pair of oppositely poled diodes 356 and 357 provide non-linear feedback to the amplifier stage 346, which feedback is dependent upon the voltage-current characteristics of the diodes.

The second stage 347 is similar to stage 346 and includes a transistor 360, a positive supply terminal 361, resistors 362, 363 and 364, a capacitor 365, diodes 366 and 337 and a capacitor 368 coupling the output of the stage 346 to the input of the stage 347.

The third stage 348 is also the same as stages 346 and 347 and includes a transistor 370, a positive power supply terminal 371, resistors 372, 373, 374, a capacitor 375, diodes 376 and 377 and a capacitor 378 coupling the output of the stage 347 to the input of stage 348.

If a positive going voltage signal is applied to the resistor 353, an input current will flow through the resistor to the base electrode of transistor 350. The current gain of transistor 350 is high so that, when only a small portion of the input current flows into the base electrode of transistor 350, the collector current will increase to drive the collector voltage negative. This negative going voltage will forward bias diode 357 causing current to flow through it from the base electrode of transistor 350 to its collector electrode. The collector voltage will go negative till the current through diode 357 plus the base current of transistor 350 is equal to the input current through resistor 353. The current gain of transistor 350 is high so that most of the input current through resistor 353 will flow through diode 357 and only an insignificant portion of the input current will flow into the base electrode. Therefore, the current through the diode 357 is substantially equal to the input current through resistor 353. When this happens there is only a small change in voltage at the base terminal of transistor 350 so the change in collector voltage is substantially equal to the change in voltage across diode 357. Since the current through diode 357 is substantially equal to the input current, the gain of the limiter stage is defined by the voltage-current characteristic of diode 357 when the input voltage goes positive.

Similarly when a negative voltage is applied to the input resistor 353, current will flow out of the base electrode of transistor 350 causing the transistor to decrease its collector current. This makes the voltage at the collector electrode of transistor 350 go positive which will forward bias diode 356 until the current through the diode is nearly equal to the current in resistor 353. The positive output voltage at the collector of transisitor 350 is defined by the voltage drop across diode 356 when the current through the diode is equal to the input current in resistor 353 and the negative output voltage is defined by diode 357 in the same manner. Since the voltage-current characteristic of the diodes is nonlinear the voltage gain becomes very high for low level inputs and quite low for high inputs. This gain characteristic is shown graphically in FIG. 6.

Figures 6, 7, 8:
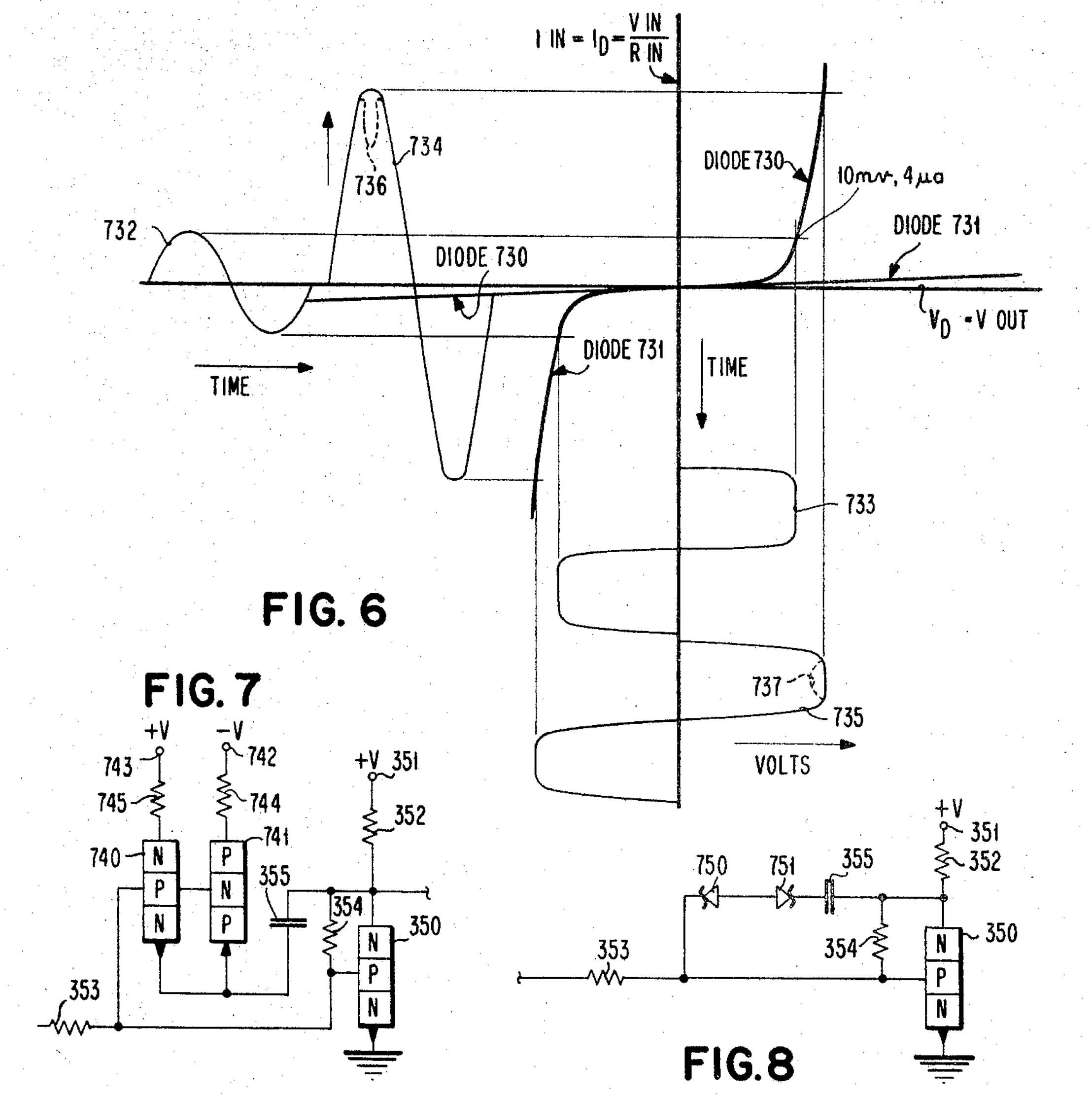
FIG. 6 is a graph illustrating the diode characteristics and the operating characteristics of the improved limiter.
FIGS. 7 and 8 show alternative forms of the improved limiter.

FIG. 6 shows two input waveforms going in on the vertical axis of the gain characteristics (defined by two diode curves) and their appropriate outputs. It can be seen from FIG. 6, that small input signals are amplified greatly while large signals have lower gains so that all but extremely small signals result in outputs which are substantially square waves of nearly equal amplitudes.

Figure 5:
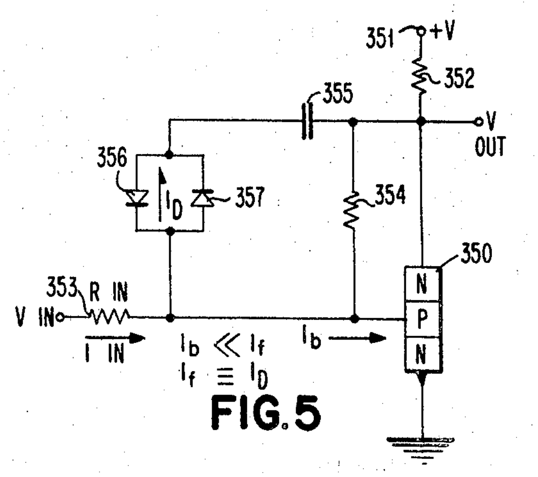
FIG. 5 is a reproduction of the improved limiter of the present invention.

The limiter stage 346 of FIG. 2*d* has been reproduced in FIG. 5 adjacent the curve of FIG. 6 for ease of examination of the operating characteristics shown in FIG. 6 which are applied to FIG. 5.

It will be assumed that the diodes 356 and 357 are conventional silicon diodes which are readily available on the market. These diodes have characteristics similar to those shown by the lines 730 and 731 of FIG. 6, where line 730 represents the voltage current characteristic of diode 357 and line 731 represents the voltage current characteristic of diode 356. Attention is directed to the voltage axis line which is marked —V out. This representation is necessary since it will be appreciated that the input voltage becomes inverted at the collector output.

When a relatively low amplitude signal 732 is applied to the input terminal, an inverted output voltage 733 will be produced. It has been assumed for purposes of illustration that the maximum positive and negative levels of the input signal 732 are approximately ten millivolts, each of which produces a four microampere maximum current through the input resistor 353. This maximum input current level of four microamperes appears on the diode curves 730 and 731 at approximately a 400 millivolt level. Hence the ten millivolt input signal is amplified and limited at approximately 400 millivolts at the output collector terminal.

These ten millivolt signals are at a level, at which signals are not accepted by the receiver unit 2 as data signals. Thus the signal 732 is in fact a noise signal, which will render the threshold clamp circuit 25 effective to clamp the line 24.

Thus noise level signals having an amplitude in the order of the amplitude for the signal 732, will be substantially amplified at the output terminal of the stage 346. By the time it is further amplified in the succeeding limiter stages, it will have an amplitude and waveform substantially equal that of input data signals at the acceptable data levels.

A brief analysis of the diode characteristics of FIG. 6 clearly illustrates the even higher gain characteristics at lower levels of input signal than that shown for the waveform for signal 732. Thus if we decrease the maximum amplitude of the signal 732 to half of that which is shown, that is, two microamperes, there is very little decrease in the output amplitude of the waveform 733.

It will be appreciated that the curves 730 and 731 are for the purposes of illustration, neglecting the effect of the resistor 354 in the shunt feedback path. However, this resistor is of a very high value and except at very low signal levels it is of no consequence in the overall A.C operation of the limiter.

An input signal 734, having an amplitude which is in the range of acceptable data signals, produces an output signal 735 inverted in polarity. This output signal 735 is not substantially larger than the signal 733. After the signals 733 and 735 are amplified by the second and third stages of the three stage limiter, they will be substantially equal.

The effect that noise will have upon the receiver 2 when data signals are present is well illustrated by the curves 734 and 735 and in particular with respect to the broken line portions 736 and 737. The broken line portions 736 of the curve 734 illustrates a noise pulse which is superimposed upon the signal 734 just prior to the signal 734 reaching its maximum positive level. Since the levels of the noise portion of the signal 734 at its uppermost and lowermost values are both within that portion of the diode characteristic 730 which is the low impedance region, this noise signal will not substantially alter the impedance of the diode and therefore will not substantially alter the gain of the limiter stage. Thus a relatively small noise signal, illustrated at 737, is superimposed upon the output pulse 735. This relatively low level noise pulse at 737 will be for all practical purposes, substantially eliminated in the next succeeding limiter stage 347 and will be for all practical purposes, completely eliminated by the time the signal 735 passes through the final limiter stage 348.

The maximum level of the input signal 734 is in the order of eighty millivolts peak-to-peak. Maximum signal levels which may be applied to the input stage 346 of the limiter 21 are in the order of two volts peak-to-peak. The diode characteristics are such that these maximum level signals produce in the first limiter stage 346 output signals which are in the order of one-and-two-tenths volt peak-to-peak. Three stages of limiting provided by stages 346, 347 and 348 produce one uniform output level at the stage 348. Noise signals, which are superimposed upon actual data signals, will be completely eliminated by the three stages of limiting with the possible exception that a noise pulse could be so great as to exceed the momentary value of an out of phase input data signal level so that momentarily the input signal level goes to approximately 0 volt, in which case the noise signal might be passed by the limiter.

One of the most important advantages of this limiter circuit is that there is no limitation on the initial gain which can be provided for very low level signals. In contrast, known limiters of the type including alternate stages of amplification and limiting are generally limited to gain factors in the order of three or four. The present limiter circuit can have higher gain levels by using transistors which have higher gain characteristics or by using a two transistor amplifier, the overall gain of which can be made substantially higher. Then, with a transistor which has an inherently higher gain characteristic, the input resistor such as resistor 353 of the stage 346 can be made smaller to substantially increase the maximum gain at lower levels.

It will also be appreciated that other alternative circuit configurations are possible. Two of these configurations shown in FIGS. 7 and 8 will be described later.

Figure 2E:
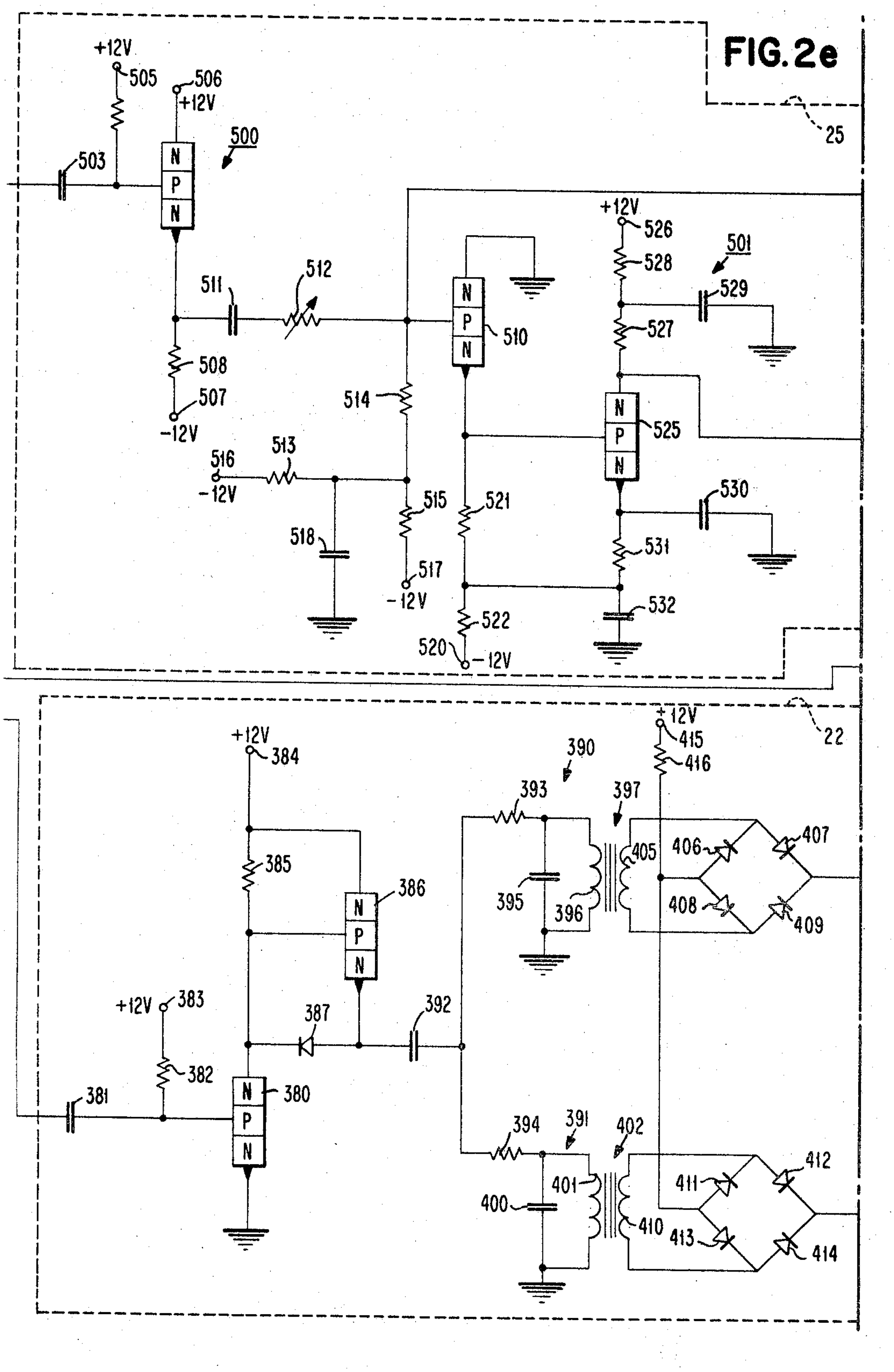
Figure 2F:
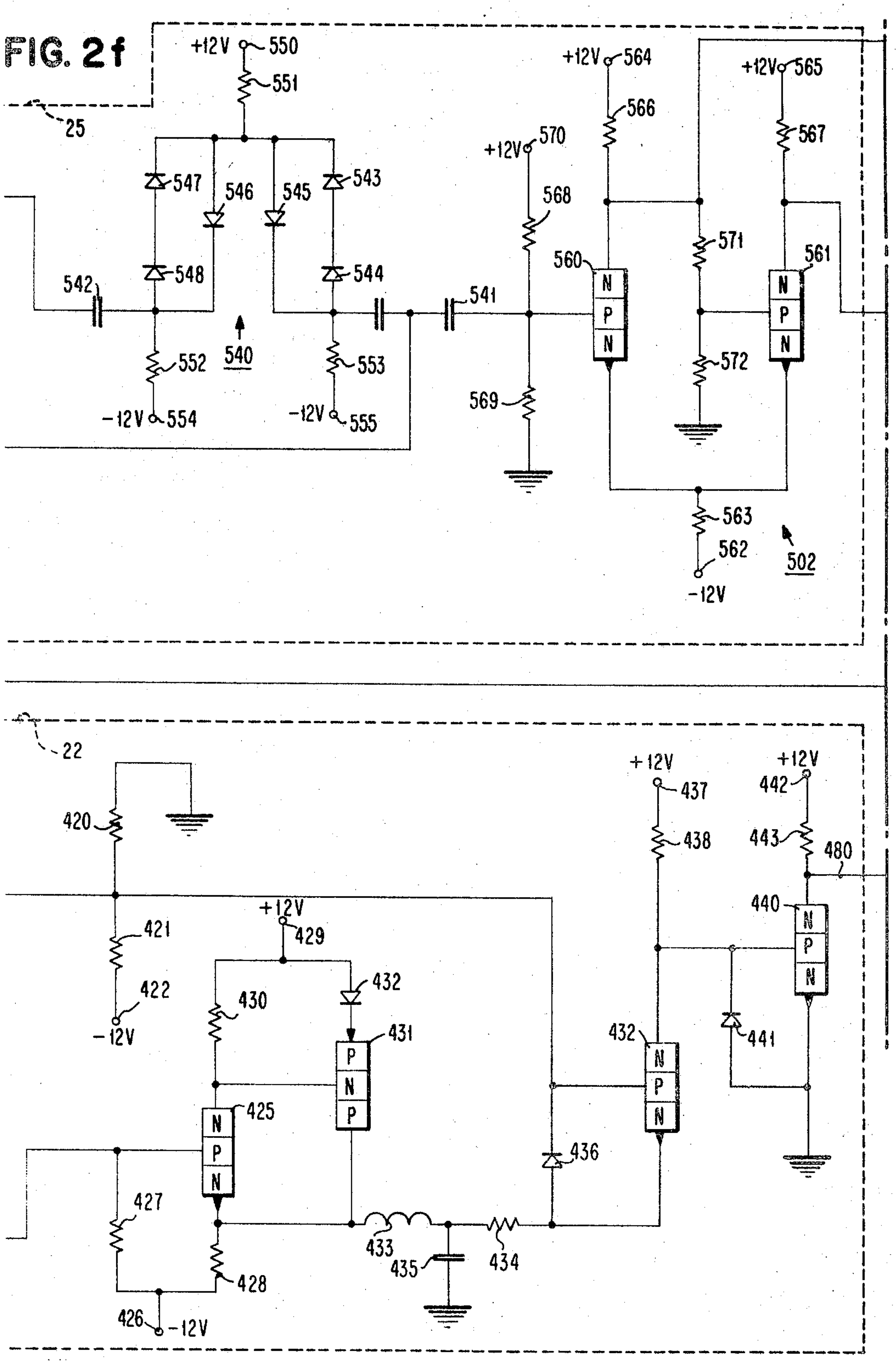

Discriminator and detector circuit 22—FIGS. 2*e*, 2*f*

The output of the limiter 21 is applied to the input of the discriminator and detector circuit 22. The substantially square wave signals produced by the limiter 21 are applied to a grounded emitter amplifier 380 by means of a coupling capacitor 381. A bias resistor 382 is connected to a positive supply terminal 383 and to the base electrode of the transistor 380 to provide a bias supply for operating the transistor at a desired level. The positive half cycles of the input signal applied to the capacitor 381 tend to drive the transistor to saturation, and the negative half cycles turn the transistor 380 off.

The collector electrode of the transistor 380 is connected to a positive supply terminal 384 by way of a resistor 385. A transistor 386, connected as an emitter follower, has its base electrode and its collector electrode connected to opposite ends of the resistor 385. A diode 387, connected across the base emitter terminals of the transistor 386, conducts while the base-emitter junction of the transistor 386 is reverse biased and presents a high impedance across the base-emitter junction while the transistor 386 is conducting. Output signals from the amplifier comprising transistors 380 and 386 are applied to a pair of tank circuits 390 and 391 by way of a coupling capacitor 392 and isolating and Q determining resistors 393 and 394.

The first tank circuit 390 includes a capacitor 395 and the primary winding 396 of a transformer 397. The value of the inductance of the transformer 397 and the value of the capacitor 395 is selected so that the tank circuit 390, in the preferred embodiment, will have a resonant frequency of one kilocycle. Preferably the Q of the circuit is selected for a desired band width for the data rate; for example, 600 baud, or a band width of 600 cycles per second.

The tank circuit 391 includes a capacitor 400 and the primary winding 401 of a transformer 402. The capacitive and inductive values of the capacitor 400 and of the transformer 402 are selected so that the tank circuit 391, in the preferred embodiment, has a resonant frequency of 2200 cycles per second. The Q of the circuit is selected preferably for a band width of 600 cycles per second.

The transformer 397 includes a secondary winding 405 which is connected to a full wave rectifier including diodes 406, 407, 408 and 409. The transformer 402 includes a secondary winding 410 which is connected to a full wave rectifier comprising diodes 411, 412, 413 and 414. One terminal of each of the full wave rectifiers is connected to a positive supply terminal 415 by way of a resistor 416. The other terminal of the upper full wave rectifier is connected to a reference potential determined by the junction between a pair of resistors 420 and 421 connected in series between ground potential and a negative supply terminal 422. In a preferred embodiment of the present invention, the reference potential set by the resistors 420 and 421 and the power supply to which they are connected will be approximately −1 volt.

The other terminal of the lower full wave rectifier is connected to the base electrode of a transistor 425. The base electrode of the transistor 425 is connected to a negative supply terminal 426 by way of a bias resistor 427. The emitter electrode of the transistor 425 is connected to the terminal 426 by way of a resistor 428, and its collector terminal is connected to a positive supply terminal 429 by way of a resistor 430.

A transistor 431 has its base electrode connected directly to the collector electrode of the transistor 425 and its collector electrode connected directly to the emitter electrode of the transistor 425. Its emitter electrode is connected to the supply terminal 429 by way of a diode 432. The transistors 425 and 431 form a high gain amplifier.

The junction between the resistors 420 and 421 is also connected to the base electrode of a transistor 432, the emitter electrode of which is connected to a low frequency filter comprising a series-connected inductor 433 and resistor 434 and a capacitor 435 connected between the junction of the inductor and resistor and ground potential. The inductor 433 is also connected to the emitter electrode of the transistor 425 and to the collector electrode of the transistor 431. A diode 436 is connected across the base emitter junctions of the transistor 432, and the collector electrode of the transistor 432 is connected to a positive supply terminal 437 by way of a resistor 438.

The collector electrode of the transistor 432 is connected to the base electrode of a transistor 440, and a diode 441 is connected across base emitter electrodes of the transistor 440. The emitter electrode of the transistor 440 is connected to ground potential and its collector electrode is connected to a positive supply terminal 442 by way of a resistor 443.

As will be seen in more detail below, the circuit constants of the discriminator and detector circuit 22 are selected so that, when no signal is applied to the input capacitor 381, there is no current flowing through the low pass filter elements 433 and 444. When data signals are applied to the capacitor 381, the carrier frequency is removed by the low requency filter, and data in digital form appears at the output of the transistor 440. This will be described in greater detail below. For the present, it will be sufficient to say that the input signals at the collector electrode of the transistor 440 are at their relatively positive level in response to each logic "1" input signal and at ground potential for logic "0's."

Square wave signals from limiter 21 are applied to transistor 380 by way of capacitor 381. The frequency is one or the other of two carrier frequencies representing the logical "1" or logical "0."

When the signal applied to capacitor 381 goes positive, transistor 380 is turned on, driving its collector electrode negative, forward biasing diode 387, driving the capacitor 392 to its negative level. At this time, transistor 386 is turned off.

When the negative-going signal is applied to capacitor 381, the transistor 380 is switched off and its collector goes positive. This drives the base electrode of transistor 386 positive, causing the emitter electrode of transistor 386 to go to its positive level; and diode 387 is reverse biased. In this manner, the square wave coming from the limiter is amplified and inverted by an amplifier consisting of the transistors 380 and 386, and this signal is coupled to the resonant circuits 390 and 391 by way of the coupling capacitor 392.

The resonant circuit 390 develops a large amplitude when driven by a frequency representing a logical "1"; and a lower amplitude when driven by frequencies other than the logical "1." Similarly, resonant circuit 391 develops a large amplitude when the received frequency is that of the logical "0"; and it develops lower amplitude when the frequency is other than the logical "0."

The signal developed in the resonant circuit 390 is coupled to the rectifier bridge circuit by way of the transformer 397. The rectifier bridge consisting of diodes 406, 407, 408 and 409 performs a full wave rectification of the signal coming from the resonant circuit 390, such that the signal developed from the cathodes of diodes 407 and 409 to the signal at the anodes of the diodes 406 and 408 is a negative-going full wave rectification of the signal from resonant circuit 390.

Similarly, the full wave bridge circuit consisting of diodes 411, 412, 413 and 414 performs a full wave rectification of the signal on the resonant circuit 391. In this case, the signal seen on the cathodes of diodes 412 and 414, with respect to the potentials on the anodes of diodes 411 and 413, would be that of a full wave rectification signal, swinging positively.

Since the cathodes of diodes 407 and 409 are connected to a voltage source consisting of resistors 420 and 421 and the two rectifier circuits are connected in a series manner, it is found that the signal seen at the cathodes of diodes 412 and 414 would be that of the difference of the full wave rectifications of signals found on the resonant circuits 390 and 391.

For received frequencies representing a logical "1," the amplitude in the resonant circuit 390 is greater than that in the resonant circuit 391 so that the resultant signal found at the cathodes of diodes 412 and 414 is that of a negative-going rectified signal.

For a received frequency representing a logical "0," the amplitude of the signal in the resonant circuit 391 is greater than that of the signal on the resonant circuit 390 so that the resultant output signal found at the cathodes of diodes 412 and 414 is that of a positive-going full wave rectified signal.

The signal at the cathodes of diodes 412 and 414 is coupled to the base electrodes of transistor 425. Transistors 425 and 431 act as a current amplifier or isolation amplifier to couple signals from the rectifiers to the low pass filter consisting of the inductor 433 and the capacitor 435. This low pass filter passes only the average voltage coming from the rectifiers so that the carrier frequency is removed from the output signal.

If the frequency representing the logical "1" is received, the negative-going full wave rectified signal is coupled into the low pass filter so that the output of the low pass filter is at its most negative level. If the frequency representing the logical "0" is received, the input to the low pass filter is a positive-going full wave rectified signal, and the output of the filter is at its most positive level.

This positive or negative level coming from the low pass filter is coupled to transistor 432 by way of the resistor 434. If the output of the low pass filter is at its positive level, transistor 432 is switched off; if the output level from the low pass filter is at its negative level, transistor 432 is switched on. This results in transistor 432 being switched on for logical "1" signals and being switched off for logical "0" signals.

Since the output of the low pass filter moves slowly from the negative to positive levels, and similarly from the positive to negative levels, it is important that transistor 432 switches when the output of the low pass filter is near the midpoint between its maximum excursions. Otherwise, we would find that the switching of the transistor 432 switches when the output of the low pass filter to increase the pulse width of the one type of data bit while decreasing the pulse width of the other type of data bit.

As an example, if transistor 432 switches at a level more positive than the average output level of the low pass filter, it would be found that, when the received signal changes from a logical "1" to a logical "0," it would take more time for the output of the low pass filter to reach the switching threshold than it would when the frequency changes from the logical "0" to the logical "1." As a result, it would be found that the output of transistor 432 would tend to increase the width of the logical "1" and decrease the width of a logical "0."

Similarly, if the switching threshold of transistor 432 is more negative than the average output levels from the low pass filter, the width of the logical "1" pulse would be decreased and the width of the logical "0" would be increased. In order to guarantee that this switching level is maintained close to the midpoint between the output excursions of the low pass filter, the transistors 425 and 432 have been chosen to have matched base-emitter drops. If the potential at the base of transistor 425 is the same as the potential at the base electrode of transistor 432, the transistor 432 is very near its switching threshold so that, if the base electrode of transistor 425 is driven slightly positive, transistor 432 is switched off. If the base electrode of the transistor 425 is driven slightly negative, the transistor 432 is switched on.

With no signal in the resonant circuits 390 and 391, the potential at the base electrode of transistor 425 is essentially the same as the potential at the base electrode of transistor 432. This is accomplished by having the potential at the base electrode of transistor 425 determined by the potential at the base electrode of transistor 432, plus the drops in the diode bridge consisting of diodes 406, 407, 408 and 409 minus the diode drops in the bridge consisting of diodes 411, 412, 413 and 414. The drops at the bridge circuits cancel out, thereby making the potentials of the two base terminals equal. In this manner, an extreme effort is made to have all drops within the discriminator circuit cancel out so that there will be as little error in the switching threshold of transistor 432 as is possible.

When transistor 432 is conducting, its collector current is coupled to the base electrode of transistor 440 to cause transistor 440 to switch off. When transistor 432 is not conducting, the transistor 440 will be turned on by way of the resistor 438. As a result, when logical "1" frequencies are received, transistor 440 will be on and its collector electrode will be at ground potential. When a logical "0" is received, transistor 440 will be in its off state and its collector electrode will be in its positive potential.

Figure 2G:
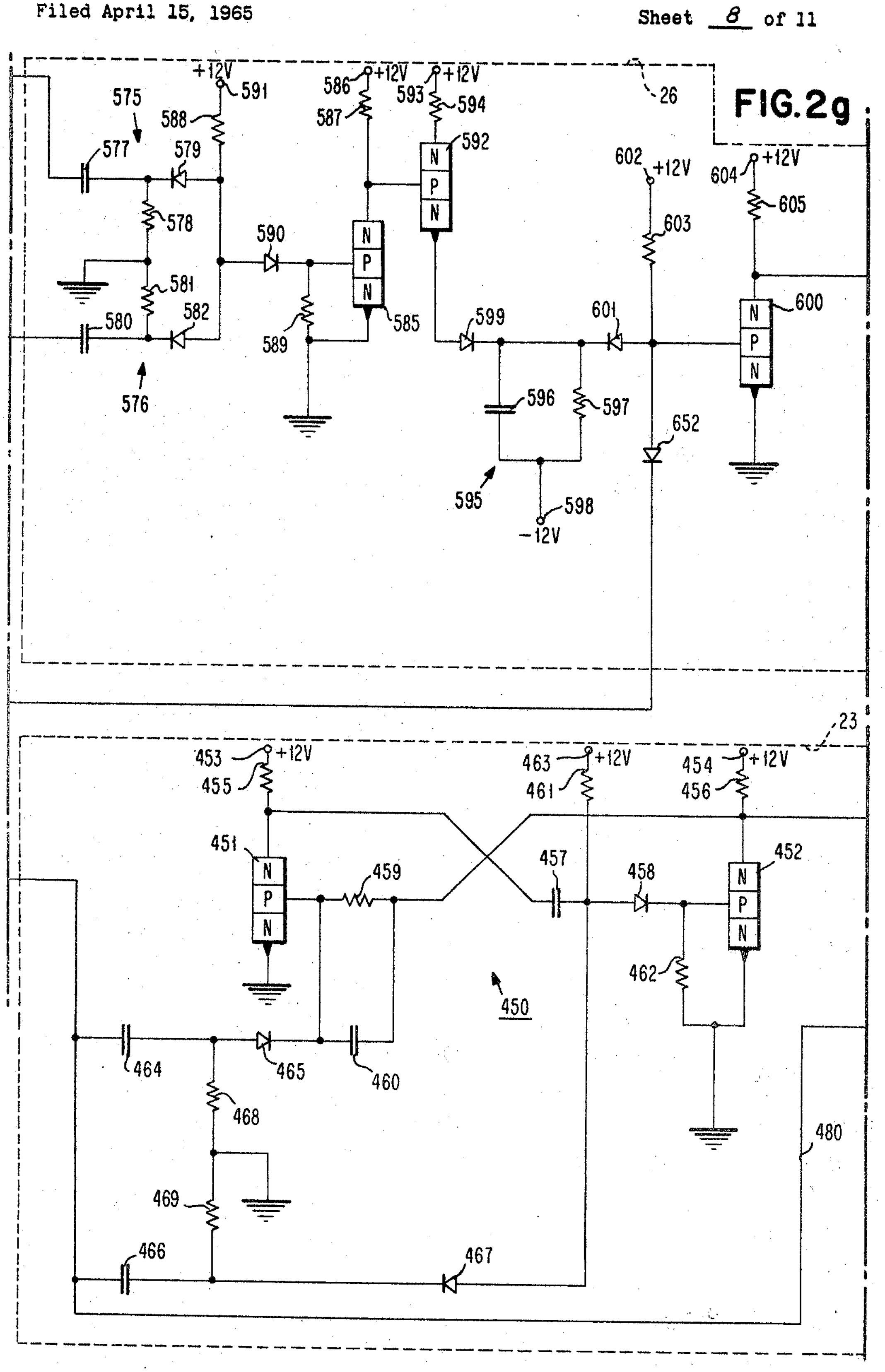
Figure 2H:
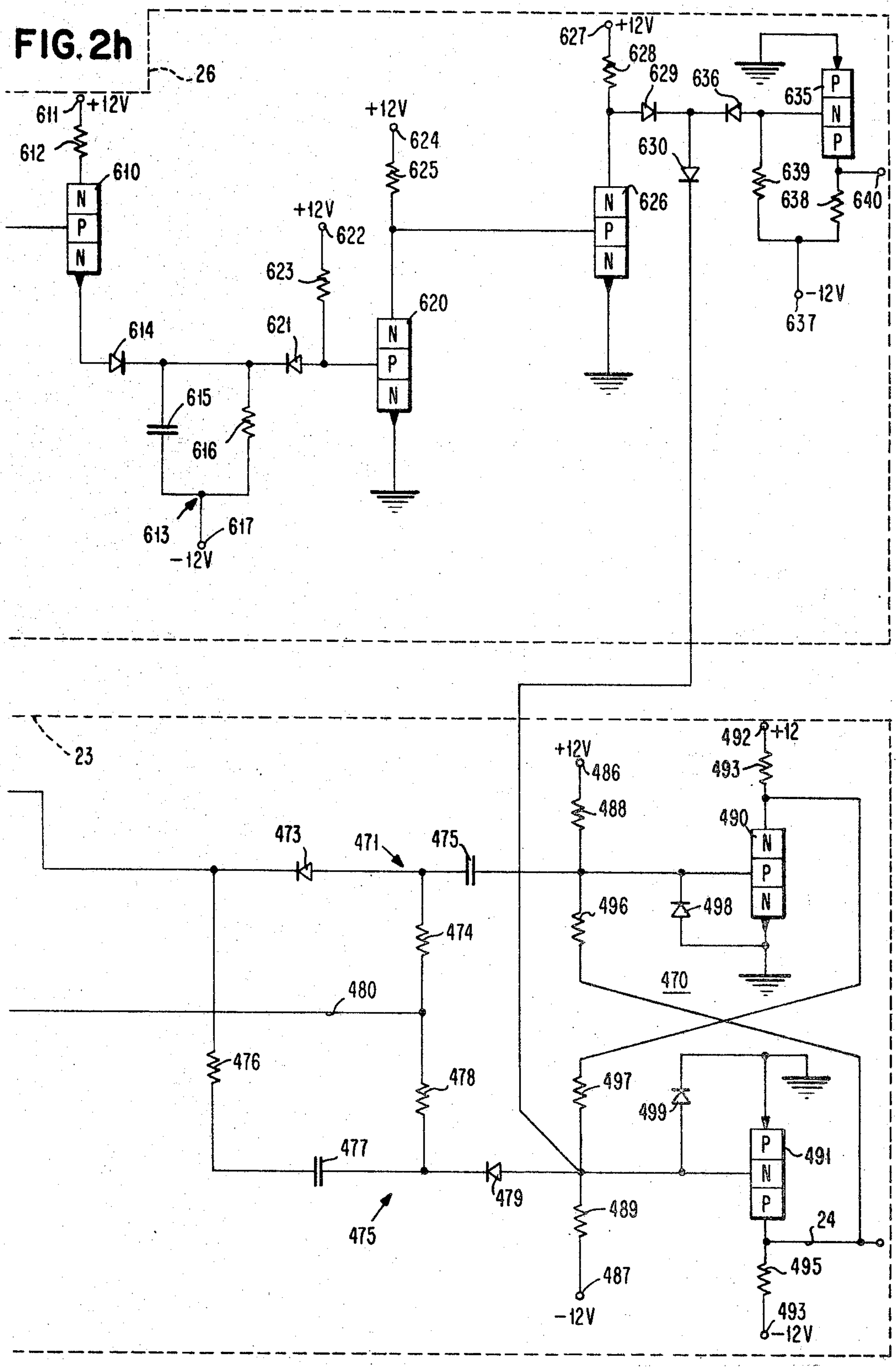

Delay circuit 23—FIGS. 2*g*, 2*h*

The output signals of the circuit 22 appearing at the collector electrode of the transistor 440 are applied to the delay circuit 23 by way of the conductor 480. In the preferred embodiment, these output signals are delayed between the collector electrode of the transistor 440 and the output line 24, which is connected to the related data processing equipment, by one millisecond.

It is important to the transmission apparatus of the present invention that both the leading and trailing edges of data pulses be delayed by exactly the same time interval. This is achieved in the delay circuit 23 by the use of the monostable device 450 which includes a pair of grounded emitter transistors 451 and 452. The collector electrodes of the transistors 451 and 452 are connected to positive supply terminals 453 and 454 by way of resistors 455 and 456, respectively.

The collector electrode of the transistor 451 is cross-coupled to the base electrode of the transistor 452 by way of a capacitor 457 and a diode 458. The collector electrode of the transistor 452 is cross-coupled to the base electrode of the transistor 451 by way of a parallel-connected resistor 459 and capacitor 460.

A voltage divider comprising the diode 458, a resistor 461, and a resistor 462 is connected between a positive supply terminal 463 and ground potential to bias the transistor 452 on; and the transistor 451 is normally turned off.

The collector electrode of the transistor 440 is coupled to the base electrodes of both transistors 451 and 452. The coupling circuit to the base electrode of the transistor 451 includes a capacitor 464 and a diode 465. The coupling circuit to the transistor 452 includes a capacitor 466 and a diode 467. The junction between the capacitor 464 and the diode 465 and the junction between the capacitor 466 and the diode 467 are returned to ground potential by way of resistors 468 and 469, respectively.

When the output of the transistor 440 goes positive, a positive-going pulse is applied through the diode 465 to the base electrode of the transistor 451 to turn the latter on and the transistor 452 off. When the output of the transistor 440 goes negative, a negative transient is applied through the diode 467 to cause the transistor 452 to be turned off and the transistor 451 to be turned on.

Thus it can be seen that both the negative and positive-going transients of the output signal from the transistor 440 switch the monostable device 450 to its unstable state. The time constant of the monostable circuit 450 must be shorter than the time duration of a data bit since it must produce an output pulse from the monostable device for each positive and negative level change in the incoming signal.

These output signals of the monostable device 450 appear at the collector electrode of the transistor 452 and are at a positive level for a predetermined time interval, after each change in the input signal level.

These output signals from the monostable device 450 are applied to a bistable trigger 470 by a pair of input gate circuits 471 and 472. The gate circuit 471 includes a diode 473, a resistor 474 and a capacitor 475. The gate circuit 472 includes a resistor 476, a capacitor 477, a resistor 478 and a diode 479.

Output pulses from the discriminator and detector circuit 22 appearing at the collector electrode of the transistor 440 (FIG. 2*f*) are coupled to the junction between the resistors 474 and 478 by means of a conductor 480.

The negative-going transients of the output pulses from the monostable device 450 (which occur one millisecond after each level change on the conductor 480) are utilized to sample the level of the output signals from the discriminator and detector circuit 22 after each level change to determine whether they are at the logical "1" or "0" state.

When the output level of the discriminator and detector circuit on the conductor 480 is at its relatively negative level, the capacitor 477 is charged by way of the resistor 478; and the negative-going transient from the monostable device 450, which occurs one millisecond later, sends a negative pulse through the resistor 476 to the capacitor 477 to produce a negative pulse which forward biases the diode 479.

When a negative-going transient appears at the output of the monostable device 450, after the output of the discriminator and detector circuit appearing on the conductor 480 goes positive, the capacitor 475 will have been charged to a positive level and the negative-going transient will forward bias the diode 473 and cause a negative-going pulse to appear at the output fo the capacitor 475.

The output terminals of the gate circuits 471 and 472 are connected to the base electrodes of a pair of transistors 490 and 491 which are connected as a bistable device. More specifically, the emitter electrodes of the transistors 490 and 491 are connected to ground potential and their collector electrodes are connected to positive and negative supply terminals 492 and 493 by way of resistors 494 and 495.

The collector electrodes of the transistors 490 and 491 are cross-coupled to the base electrodes of each other by way of resistors 496 and 497. Diodes 498 and 499 are connected across the base emitter terminals of the transistors 490 and 491 to prevent excessive reverse biasing of the base emitter junctions. The base electrodes of the transistors 490 and 491 are connected to positive and negative supply terminals 486 and 487 by way of bias resistors 488 and 489.

The transistors 490 and 491 have two stable states; either both transistors are in saturation or both are cut off.

It will be recalled that the monostable device 450 samples the output level from the discriminator and detector circuit appearing on the conductor 480. When the conductor 480 is relatively positive, a negative-going pulse will appear at the output of the gate circuit 471, thereby causing the transistor 490 (and the transistor 491) to be turned off in the event it is conducting.

When the conductor 480 is relatively negative, the negative-going transient from the monostable device 450 produces a negative pulse at the output of the gate circuit 472 to turn the transistor 491 (and the transistor 490) on in the event that it is off.

When the transistors 490 and 491 are conducting, the conductor 24 is at ground potential which is representative of a logical "0" condition; and, when both transistors are turned off, the line 24 is at the negative level which is representative of a logical "1" condition.

These levels appearing on the conductor 24 have been delayed with respect to the data pulses appearing on the conductor 480 by means of the one millisecond time delay of the monostable device 450. In the preferred embodiment, the minimum pulse width of data pulses is in the order of one and two-thirds milliseconds, thus obviating errors due to the delay circuit. Since both the positive-going and negative-going changes in the output signal from the discriminator and detector circuit 22 both actuate the same time delay device, the monostable device 450, both changes in the data signal levels will be delayed to exactly the same time interval.

This is particularly important in data transmission apparatus since many unequal delays are encountered in the transmitting and receiving apparatus as well as on the line itself; and these delays render the originally uniform bit time intervals non-uniform. Since the data bits of a given character are received serially and are sampled at equally spaced time intervals, it is important to prevent variations in the bit width and uniformity.

Line clamp threshold circuit 25—FIGS. 2*e*, 2*f*

It will be recalled that signals received over the line 3, whether they represent data or noise, are applied to the band pass filter 20. Although those noise signals which are higher and lower in frequency than the data signal frequencies are substantially attenuated by the band pass filter 20, nevertheless, the limiter circuit 21 of FIG. 2*d* has such a high gain at low level signals that it is possible in many instances for the attenuated noise signals to be amplified to the extent that they appear in amplitude substantially equal to the amplitude of data signals at the output of the last stage 348 of the limiter 21.

Thus, means must be provided to prevent such signals from being transmitted over the output line 24 to the associated data processing apparatus. These means are provided in the form of two circuits which perform two different functions.

power supplies, the voltage divider 704 always applies a constant percentage of the input voltage from the switch 702 to the output of the voltage divider at junction 711. As shown above, the change in charge on the capacitor 706 is limited by the voltage levels at the junction 711. Since the voltage appearing at the junction 711 is a constant percentage of the signal coming from the switch 702, this percentage determined by the relationship between the resistors 707 and 708, the change in the charge on the capacitor 706 will be the same constant percentage as found at the junction 711.

In an RC integrator circuit such as circuit 703, the time required to charge the capacitor to a given percentage of its total possible charge is defined entirely by the product of the resistance and the capacitance in the integrator. Since the percentage of the signal swing from switch 702 to which the voltage at the junction 710 will charge is constant, the frequency is independent of the actual potential coming from the circuit 702.

By selecting high tolerance components for resistors 705, 707, 708 and 712 and capacitor 706, precise frequency control is achieved. The half cycle time of the oscillator is defined by the equation $$\frac{R1}{R1+R2}-1=e^{\frac{-t}{RcC}}$$

where

R1 is the resistance of resistor 708,
R2 is the resistance of resistor 707,
Rc is the resistance of resistor 705 (or 705+712),
C is the capacitance of capacitor 706, and
*e* is a constant.

Limiter variations—FIGS. 7 and 8

In FIG. 7, the function of the diodes 356 and 357 of FIG. 5 is performed by the base-emitter junctions of a pair of transistors 740 and 741; the other components of FIG. 7 which correspond to similar components in FIG. 5 have been assigned similar reference numerals. In this embodiment of FIG. 7, the transistor collector electrodes are connected to negative and positive supply terminals 742 and 743 by way of resistors 744 and 745. The resistors 744 and 745 are selected so that they will cause saturation of the transistors 741 and 740, respectively, when the base-emitter current in the forward bias direction reaches a predetermined value. At this level, the voltage drop from the base to the emitter becomes clamped at a predetermined level.

This phenomenon of the voltage drop across the base-emitter junction of a saturated transistor to produce a constant clamp voltage, which has a sharper break characteristic than that of conventional diodes, is described more fully in said copending patent application of I. G. Akmenkalns.

Said Akmenkalns application is hereby incorporated herein by reference as if it were set forth in its entirety.

As described in said Akmenkalns application, the precise voltage at which the base-emitter clamp becomes effective can be selected by choosing the value of the collector resistor so as to cause saturation to occur at the selected base-emitter clamp voltage. When saturation occurs, the base-emitter voltage does not vary in response to higher input levels. This constant base-emitter voltage provides improved limiting action.

FIG. 8 shows a third embodiment of the limiter wherein the diodes are replaced by a pair of Zener diodes 750 and 751, which are connected in series between the capacitor 355 and the input resistor 353. This embodiment would be advantageous in the event that substantially higher output voltage variations are desired.

Input signals of one polarity will drive one of the two Zener diodes 750 or 751 into its low impedance region only after its reverse bias breakdown level is exceeded. Meanwhile the other Zener diode will be forward biased to its low impedance region at a lower level, but this will be of little consequence to the gain characteristic since the other series diode is still at its high impedance level.

Then when the input signal is at the other polarity level, the previously forward-biased Zener diode is in its high impedance region until its reverse bias breakdown voltage is exceeded.

Consequently, the Zener diodes 750 and 751 limit the output amplitudes at the collector electrode of the transistor 350 at the positive and negative levels at which reverse breakdown of the diodes occurs, and assure high gain characteristics between these levels. These voltage swings at the collector electrodes of the transistor 350 will be determined by the low impedance voltage drop of the forward-biased Zener diode, as well as the reverse breakdown voltage drop of the reverse-biased Zener diode.

If nonsymmetrical output signals are not objectionable, only one Zener diode need be used. In this case, the high gain region lies between the forward bias and reverse bias low impedance regions of the diode.

It has been assumed that, with respect to all limiter embodiments, the maximum gain of the amplifier is very high and that the base current $I_b$ (FIG. 5) is only a very small fraction of the input current $I_{in}$ and the the feedback current $I_f$.

Variations of the line clamp threshold circuit—FIGS. 9–12

Figures 9, 10:
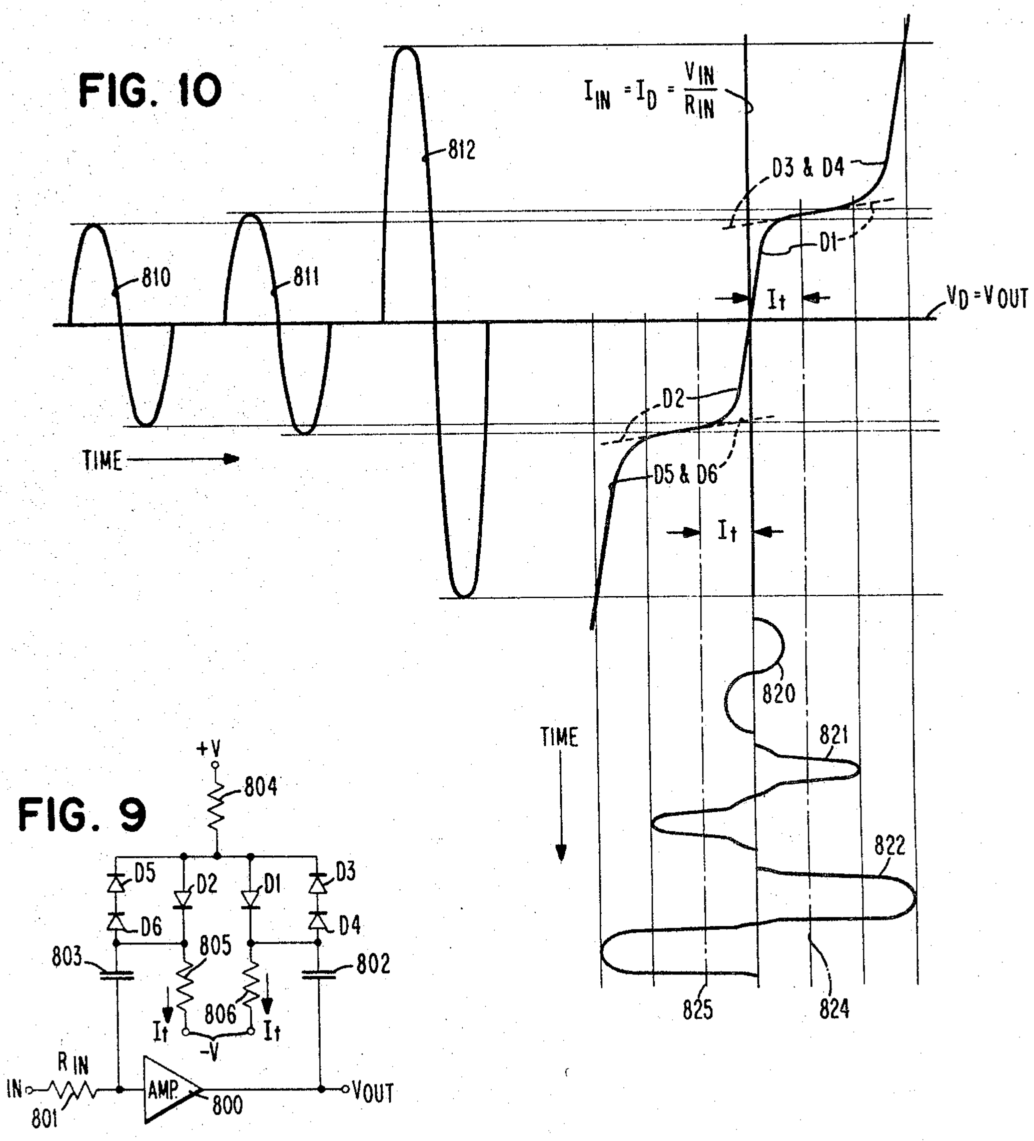
FIG. 9 is a diagram partially schematic and partially diagrammatic illustrating the improved nonlinear shunt feedback circuit of the present application.
FIG. 10 is a graph illustrating the diode characteristics of the improved nonlinear shunt feedback amplifier together with the operating characteristics of the amplifier.

FIG. 10 is a graph illustrating the diode-feedback-gain characteristics of the line clamp threshold circuit 25 of FIGS. 2*e* and 2*f*. FIG. 9 illustrates partly in schematic form and partly in diagrammatic form the nonlinear shunt feedback amplifier of FIGS. 2*e* and 2*f* in its broadest sense for ease of explanation of the curves of FIG. 10.

Thus FIG. 9 includes an amplifier 800 having an input resistor 801 and a shunt feedback circuit including a pair of capacitors 802 and 803 and a plurality of diodes D1–D6, inclusive. Resistors 804, 805 and 806 are connected to positive and negative supply terminals to provide equal bias current $I_t$ normally forward biasing the diodes D1 and D2 as to their low impedance regions, as illustrated in FIG. 10, at the zero input current, zero output voltage cross-over point. The diodes D3–D6, inclusive, are normally reverse biased.

For purposes of illustration, three input waveforms 810, 811 and 812 are illustrated. The maximum positive and negative current levels of the input signal 810 are a very small amount less than the bias currents $I_t$ of the diodes D1 and D2. The maximum positive and negative current levels of the waveform 811 are slightly in excess of the bias currents $I_t$. The maximum positive and negative values of the input current of the waveform 812 greatly exceed the bias currents $I_t$.

The threshold is reached when the input signal level is equal and opposite to one of the diode bias currents $I_t$ to cause zero current flow in the diode.

The level of the input signal 810 is below the threshold current $I_t$ and will therefore be rejected as noise, the amplitudes of the signals 811 and 812 exceed the threshold current $I_t$ and will therefore be accepted as data.

The input signals 810, 811 and 812 will produce output signals 820, 821 and 822, respectively. It can be seen that, since the maximum current levels of the signal 810 do not reach the threshold levels $I_t$, the diodes D1 and D2 do not achieve zero current conditions; and the gain of the stage is limited.

It can be seen that, when the level of the current of the input signal 811 becomes substantially equal to the threshold currents $I_t$, the output signal amplitude of the waveform 821 immediately rises to a much higher value since the current in the diodes D1 and D2 is approximately zero, whereby the feedback current is approximately zero and the gain of the amplifier is very high.

Since the maximum current levels of the input signal 812 are substantially greater than the threshold current $I_t$, they forward bias the diodes D5 and D6 during the positive half cycle and the diodes D3 and D4 during the negative half cycle to provide a limiting action in the amplifier by reason of the increase in feedback current and the consequent decrease in gain. This limiting action is not required for the threshold function; however, since data signals can vary over a range of fifty to one or more, limiting becomes necessary.

It will be recalled that a Schmitt trigger 502 is provided in the preferred embodiment of FIGS. 2*e* and 2*f* to respond to output signals from the shunt feedback amplifier. The input thresholds of the Schmitt trigger hysteresis characteristic are set within the high gain region of the amplifier, preferably at the levels illustrated by the broken lines 824 and 825; i.e., where the input current levels equal the diode bias levels $I_t$.

In the embodiment of FIGS. 2*e* and 2*f*, the threshold $I_t$ can be set with sufficient accuracy and the gain of the amplifier can be made sufficiently high so that very high signal-to-noise ratios can be tolerated, for example, in the order of twenty to nineteen. It will be noted that this data signal level of twenty is the lowest acceptable data level and that data having levels fifty or more times as great will be received.

Figure 11:
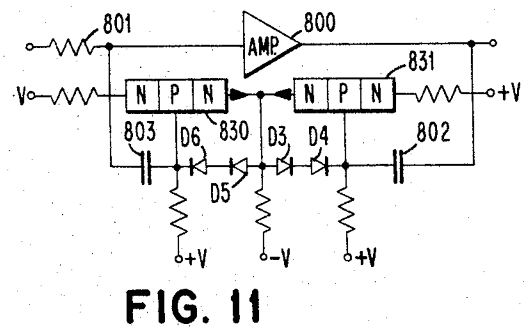
FIGS. 11 and 12 are alternative embodiments of the improved nonlinear shunt feedback amplifier of the present application.
Figure 12:
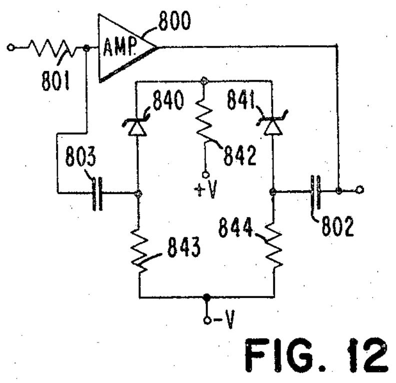

FIGS. 11 and 12 show alternative embodiments of the nonlinear shunt feedback amplifier of FIG. 9. In FIG. 11 a pair of transistor amplifiers 830 and 831, normally operated in the region of saturation, can be used to replace the diodes D1 and D2. The current-voltage characteristics of the base-emitter junctions of the amplifiers 830 and 831, described more fully in the above said Akmenkalns application, provide the nonlinear feedback function; and they can be used to provide signal-to-noise discrimination. Other components in the embodiments of FIG. 11 which correspond to components in FIG. 9 have been assigned similar reference numerals.

FIG. 12 illustrates a third embodiment of the shunt feedback amplifier of FIG. 9. In this embodiment, the diodes D1–D6, inclusive, are replaced by a pair of Zener diodes 840 and 841. Since each Zener diode has two well-defined low impedance regions separated by a region of high impedance, each Zener diode fulfills the function of three of the diodes, such as D1, D3 and D4 of FIG. 9. Preferably, the Zener diodes are biased to their reverse breakdown low impedance regions by means of resistors 842, 843 and 844 which are connected between positive and negative power supplies. Components in the embodiment of FIG. 12 which correspond to similar components in FIG. 9 have been assigned similar reference numerals.

Since many Zener diodes have very sharp break points between their high and low impedance regions at the reverse breakdown level, it is possible to achieve an even greater signal-to-noise discrimination than is possible in the embodiment of FIG. 9. For example, with particular reference to FIG. 10, if the characteristic curve starting from the zero input current-zero output voltage intersection is linear or substantially linear until the threshold $I_t$ is reached and then the characteristic becomes almost completely horizontal. It will be possible to accurately discriminate between input signal levels which have maximum amplitudes which are substantially closer to each other than those of input signals 810 and 811.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Frequency shift keying transmitting apparatus comprising a source of bivalued binary data signals;

a modulator operable at one or the other of two frequencies in response to the data signals including an integrator circuit including a resistor and a capacitor, means for applying one or the other of two charge potentials to the integrator for charging the capacitor positively and negatively about an average potential level, means for reversing the direction in which the capacitor charges each time that the change in charge on the capacitor becomes a predetermined small percentage of the applied charge potential to operate the integrator in the substantially linear region of its charge characteristic and to render the modulator frequency independent of changes in the charge potential levels, and means responsive to the momentary value of the binary data signals for setting the time constant of the integrator circuit at one or the other of two predetermined values;

a filter including a pair of oppositely poled diodes normally biased to their low impedance regions and responsive to the signal across the capacitor for producing a generally sinusoidal output waveform;

a transmission line;

a transformer having first and second windings and characterized at modulator frequencies by a maximum inductive impedance which is a small fraction of the characteristic impedance of the line;

series resistance means connecting the first winding to the line and having an impedance not substantially less than the characteristic impedance of the line; and a shunt feedback amplifier responsive to the sinusoidal signals and having a first output connected to the second winding for applying corresponding signals to the line.

2. The apparatus of claim 1 wherein said amplifier includes a second output and is responsive to signals coupled by the transformer from the line to the first output of the amplifier for producing corresponding signals at the second output.

3. The apparatus of claim 2 together with means for filtering, amplifying, limiting and detecting input signals applied to the shunt feedback amplifier by the line to produce bivalued binary signals corresponding thereto;

a bistable device;

means forcing the bistable device to one or the other of its stable states in accordance with the value of the latter binary signals;

the last-mentioned means including a monostable device responsive to each positive-going and each negative-going voltage change in the latter data signals for delaying each change in state of the bistable device for equal time intervals after said voltage changes, said time intervals being less than the minimum data bit time interval but not substantially less than the cycle time of the lowest modulator frequency;

a threshold circuit coupled to the filtering means for discriminating between signals above and below a predetermined threshold level indicative of an acceptable data signal level for producing output signals in response only to input signals at and above the threshold level; and a delay circuit effective within a predetermined time interval after the end of output signals from the threshold circuit for forcing the bistable device to a predetermined one of its stable states to prevent the control of the bistable device by detected noise, the latter time interval being in the order of the half cycle time of the lowest modulator frequency.

4. The apparatus set forth in claim 3 together with a second delay circuit having a delay interval substantially longer than the cycle time of the lowest frequency data The collector electrode of the transistor 600 is connected to a positive supply terminal 604 by means of a resistor 605 and its emitter electrode is connected to ground potential. The collector electrode of the transistor 600 is connected to the base electrode of another emitter follower 610, the collector electrode of which is connected to a positive supply terminal 611 by a resistor 612. The emitter electrode of the transistor 610 is connected to a second timing circuit 613 by means of a diode 614.

The timing circuit 613 includes a parallel connected capacitor 615 and resistor 616 connected between the diode 614 and a negative supply terminal 617. The diode 614 and the timing circuit 613 are connected to the base electrode of a grounded emitter transistor amplifier 620 by means of a diode 621. The base electrode of the transistor 620 is connected to a positive supply terminal 622 by way of a resistor 623. The collector electrode of the transistor 620 is connected to a positive supply terminal 624 by way of a resistor 625.

The circuit comprising the transistor 610 and 620 and the timing circuit 613 is similar to that comprising the transistors 592 and 600 and the timing circuit 695. However, in this instance, the time constant of the circuit has been selected for a time delay in the order of four milliseconds. When the transistor 600 is nonconducting, the positive potential at its collector electrode is applied to the timing circuit 613 by means of the emitter follower 610 to raise the voltage at the junction between the diodes 614 and 621 to this level. This turns the transistor 620 on to cause ground potential to be applied to its collector electrode.

The purpose of the timing circuit 613 is to provide a four millisecond time delay after the receipt of data from the transmission line 3 before removing the clamp from the output terminal 24 which goes to the associated data processing apparatus. This will prevent the erroneous insertion of noise signals as data signals into the associated data processing apparatus when the sending transmission unit is first turned on or when random noise occurs. The four millisecond delay allows the various circuit and line conditions to settle down to a steady state.

When the modulator 4 is turned off by the transistor 144 of the circuit 11 (FIG. 2*b*), a negative pulse is produced by the capacitor 650 and is applied to the transistor 600 by way of a resistor 651 and a diode 652 to turn the transistor off rapidly. Diodes 653 and 654 limit the voltage amplitudes of positive and negative polarities.

The collector electrode of the transistor 620 is connected to the base electrode of a grounded emitter transistor 626. The collector electrode of the transistor 626 is connected to a positive supply terminal 627 by means of a resistor 628. The collector electrode of the transistor 626 is also connected to the base electrode of the transistor 491 of the bistable device 470 in the delay circuit 23 by means of diodes 629 and 630.

When data is being received, the transistor 600 is turned on which causes the transistor 620 to be turned off. At the end of the receipt of data, the transistor 600 turns off; and within one half to one cycle time of the lowest frequency, the positive potential from the source 604 will have been applied to the capacitor 615 to turn the transistor 620 on. Ground potential at the collector electrode of the transistor 620 will turn the transistor 626 off, whereby the positive potential from the supply terminal 627 will be applied by way of the resistor 628 and the diodes 629 and 630 to the transistor 491 to turn the latter off in the event that it is not already turned off. This will cause the transistor 490 to also turn off, and the signal on the output conductor 24 will go to its negative value which is representative of a logic "1." In this condition, the receiver 2 has its output conductor 24 clamped and no data is transmitted thereover.

Subsequently when data signals are applied to the line 3 and to the timing circuit 613 by way of the band pass filter and the line clamp threshold circuit, the transistor 600 will again be turned on and ground potential will be applied by way of the transistor 600 and the base-emitter terminals of the emitter follower 610 and the diode 614 to the timing circuit 613. Since the capacitor 615 is already charged positively, the diode 614 will be reversed biased; and the capacitor 615 will discharge through the resistor 616 at the time constant of the circuit. After approximately four milliseconds, the voltage across the diode will be sufficiently negative to permit the transistor 620 to again turn off. When the transistor 620 turns off, it causes the transistor 626 to be turned on to apply ground potential to the diode 629 to remove the clamp potential from the bistable device 470 and the line 24.

The diode 629 is also coupled to a transistor 635 by way of a diode 636. The emitter electrode of the transistor 635 is connected to ground potential, and the collector electrode is connected to a negative supply terminal 637 by means of a resistor 638. The base electrode of the transistor 635 is connected to the terminal 637 by means of a resistor 639. The collector electrode of the transistor 635 is coupled to an output terminal 640 which in turn is connected to a monitor circuit (not shown) which is utilized to indicate to the operator of the data processing apparatus that the line clamp is in fact applied or not applied at the moment.

Certain of the component values for FIGS. 2*a*–2*h* are set forth below by way of example; however, other suitable values may be selected by those skilled in the art:

Resistors in ohms

| | | | |
|---|---|---|---|
| **77, 250, 514** | 10,000 | **363, 373** | 2,700 |
| **78** | 715 | **352, 362, 372** | 3,300 |
| **81** | 10,500 | **420** | 120 |
| **90** | 8,450 | **434** | 3,900 |
| **195, 354, 364,** | | **512** | 1,580–4.580 |
| **374** | 100,000 | **513** | 43,000 |
| **211** | 910 | **515** | 20,000 |
| **212, 421** | 1,000 | **521** | 5,600 |
| **213** | 1,240 | **528** | 200 |
| **216** | 8,200 | **531** | 1,600 |
| **217** | 2,700 | **551** | 412,000 |
| **220, 527** | 3,000 | **552, 553** | 590,000 |
| **222, 238, 239** | 2,000 | **556, 567** | 6,800 |
| **241** | 280 | **568** | 34,800 |
| **243, 247, 522** | 100 | **569** | 2,430 |
| **246** | 280 | **571** | 24,000 |
| **353** | 2,670 | **572** | 3,600 |

Capacitors in microfarads

| | | | |
|---|---|---|---|
| **82** | .33 | **355, 365, 375** | .1 |
| **218** | 39 | **541, 542** | 18 |
| **221, 260, 261** | 6.8 | **529, 530, 532** | 68 |
| **249, 244** | 68 | **518** | 27 |
| **234** | 10 | | |

Figure 4:
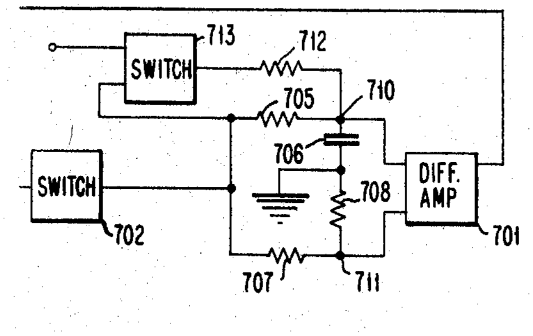
FIG. 4 is a diagram partially schematic and partially diagrammatic illustrating the improved modulator of the present application in its broadest sense.

Oscillator-modulator 700—FIG. 4

FIG. 4 illustrates diagrammatically the concept of the modulator 4 of FIG. 2*a* in its broadest form. Basically, when the modulator is considered as a single frequency oscillator, it comprises four primary parts: the differential amplifier 701, a switch 702, a voltage divider 704 and an integrator 703.

The output junctions 710 and 711 of the integrator and the voltage divider are connected to respective inputs to the differential amplifier, and the output of the differential amplifier is connected to the input of the switch. The switch has an output which is connected to both the input of the integrator and the input of the voltage divider.

The switch applies one or the other of two different voltage levels to the inputs of the integrator and the voltage divider, depending upon the state of the switch. The switch has two different states of operation and is forced into one state or the other, depending upon the state of the differential amplifier. The differential amplifier in turn has two distinct steady state conditions and two transient conditions as it pases from one steady state to the other.

The output of the integrator circuit is taken from the junction 710 between a resistor 705 and a capacitor 706 which are connected in series. The output of the voltage divider is taken from the junction 711 between resistors 707 and 798. The resistor 708 is connected to a reference potential which is intermediate the voltage levels which are applied to the voltage divider and integrator by the switch. Preferably, this reference potential is half-way between the levels of the two voltages applied by the switching device.

The capacitor can be returned to any reference level for example, ground, because the output junction or terminal of the integrator will have an average potential level which is the same as that to which the voltage divider is returned.

It will be assumed that the switch applies an output potential to the integrator 703 and the voltage divider 704 at one or the other of two levels, for example, plus and minus volts. Consequently, the resistor 708 is returned to ground potential.

When the junction 710 is more positive than the junction 711, the differential amplifier will be forced to one state; and when the junction 711 is more positive than the junction 710, the differential amplifier is forced to its other side.

Since the voltage divider is made up of purely resistive devices, the voltage level at the junction 711 will be changed instantaneously when the input voltage applied by the switch 702 is switched from one level to the other. Thus, switching of the input voltage from one level to the other produces a voltage waveform at the junction 711 which is essentially square wave in appearance. The difference in amplitude between the levels appearing at the junction 711 will depend primarily upon the relative values of the resistance elements 708 and 707 and the voltage across both.

In order to operate the integrator in the substantially linear portion of its charge characteristic, the shift in voltage level at the junction 711 is selected to be very low. With a 12 volt shift in potential at the output of the switch 702, an eight-tenths volt shift in potential at the junction 711 is suitable. Thus the potential at the junction 711 will be alternatively plus four-tenths volt or minus four-tenths volt.

The junction 710 will charge positively when the input potential is positive until it reaches essentially the potential level at the junction 711 at which time it will switch the differential amplifier 701 and the switch 702 so that the negative voltage level will be applied to the inputs of the integrator and voltage divider. At this time the capacitor 706 will start charging toward the negative level which instantly appears at the junction 711 and when it reaches essentially that level, it will cause the differential amplifier and the switch to again switch to their opposite states to apply the relatively positive voltage level to the inputs of the integrator and the voltage divider.

Thus it is seen that the junction 710 increases and decreases in voltage until it reaches the voltage level at the junction 711, which condition causes switching the differential amplifier 701 and the switch 702. If it be assumed that the speed, at which the differential amplifier and the switch will change from one state to the other, is extremely high in relation to the frequency of oscillation at which the junction 710 goes negatively and positively, then the differential amplifier and its components and the switch and its components will not affect the frequency of operation of the oscillator 700, nor will they affect the slope of the signal level appearing at the junction 710.

In the preferred embodiment, it will be appreciated that the circuit is operated at audio frequencies in the order of one and two thousand cycles per second. Differential amplifiers and switches comprised of solid state switching components are readily available for operation in the megacycle range. Consequently, the high speeds of operation of the switching devices, compared to the frequency of oscillation at the junction 710, make the waveform at the junction 710 completely independent of the characteristics of the solid state switching devices.

In the preferred embodiment, it will be recalled that it was desired to have a triangular waveform with linear slopes in both positive and negative directions and to have these slopes substantially equal. With this type of a waveform, the filter 9 of FIG. 2*b* can be utilized to change the waveform from a triangular voltage waveform to a sinusoidal current waveform. This sinusoidal current waveform is then changed back to a sinusoidal voltage waveform by means of a linear amplifier within the filter.

In order to achieve a substantially linear slope at the junction 710, it is merely necessary to limit the amount that the charge on the capacitor 706 is changed to a small percentage of the change that would be possible by charging the capacitor to the full value of the input potential supplied by the switch 702. The change in voltage level at the junction 711 is maintained to eight-tenths volt. It will be recalled that as soon as the charge on the capacitor 706 had changed sufficiently so that the voltage level at the junction 710 approached the voltage level at the junction 711 in both positive and negative directions, the differential amplifier and the switch changed the polarity of the input signal applied to the capacitor and the capacitor began to charge in the opposite direction.

As a result, the level at the junction 710 can merely swing between the levels which occur at the junction 711, that is, to plus four-tenths volt and minus four-tenths volt. This is approximately 13% of the total change in charge which the capacitor could achieve in any one stable state, whereby the slope of the voltage waveform at the junction 710 is very close to being linear. If greater linearity in the slope is desired, then the percent change in the charge of the capacitor can be reduced by changing the values of the voltage divider accordingly.

When it is desired to make the basic oscillator 700 a modulator operable at either one of two frequencies, it is achieved in its most simple form by the addition of another resistor 712 which is placed in parallel with the resistor 705 of the integrator circuit to increase the charge rate of the capacitor, thereby increasing the slope and frequency of the waveform developed at the junction 710. Since the percent of change in charge in the capacitor 706 remains the same, the same degree of linearity of slope is achieved.

The resistor 712 is selectively placed in parallel with the resistor 705 by means of a high speed electronic switch 713 controlled in accordance with bivalued input signals from a source (not shown).

The waveform produced at the junction 710 is dependent solely upon the characteristics of the resistors 705, 707 and 708 and the capacitor 706; and when the switch 713 is closed, it is also dependent on resistor 712.

In conventional sawtooth or triangular waveform oscillators, there is difficulty in maintaining accurate frequency since the circuitry normally suffers from variation in switching thresholds which might be dependent upon the base emitter drops, diode drops and leakage currents. Also variations in power supply potentials cause the frequency of oscillation to vary.

In the circuit herein presented, these problems have been reduced to insignificance since the switching thresholds are identical when switching from either half cycle to the other half cycle. This is true since the switching of the differential amplifier 701 and the switch 702 is a function of the voltage relationship between the junctions 710 and 711; and this difference is the same at the switching of each half cycle.

Frequency of oscillation is made substantially insensitive to any power supply levels since, even though the output levels of the switch 702 may be dependent of and controlled by the output of the first delay means to prevent the bistable device from being operated in accordance with detected signals applied thereto until acceptable data level signals are received continuously during its delay interval.

5. An oscillator comprising
- a power supply having a plurality of reference voltage terminals, the levels of which are subject to variation,
- a single integrator circuit having an input terminal and a resistor and a capacitor connected between the input terminal and one of the reference voltage terminals,
- switch means operable in one or the other of two states for connecting alternatively one or the other of two different ones of said reference voltage terminals to the integrator input terminal for charging the capacitor respectively positively and negatively about an average potential level, and
- second means coupled to the integrator circuit and operable to a first state to change the switch means from said one state to said other state each time the second means detects a positive change in the capacitor voltage equal to a predetermined small percentage of the charging voltage within the substantially linear region of the charge characteristic and operable to a second state to change the switch means from said other state to said one state each time the second means detects a negative change in the capacitor voltage equal to a predetermined small percentage of the charging voltage within the substantially linear region of the charge characteristic, thereby operating the integrator in the substantially linear region of its charge characteristic and rendering the oscillator frequency independent of the charge potential levels.

6. An oscillator comprising
- a power supply having a plurality of reference voltage terminals;
- an integrator circuit including an input terminal and a first resistor and a capacitor connected between the input terminal and one of the reference voltage terminals;
- a voltage divider including second and third resistors connected between said input terminal and one of the reference voltage terminals;
- a differential amplifier having a pair of input terminals, one of which is connected to a first junction between the first resistor and capacitor and the other of which is connected to a second junction between the second and third resistors, and operable in two different states in accordance with the relative levels and polarities of the voltages at the two said junctions; and
- a switch controlled in accordance with the state of the differential amplifier to apply to said input terminal one or the other of two voltage levels which are respectively higher and lower than the reference voltage connected to the voltage divider to cause the first junction to charge positively and negatively in alternate fashion toward the momentary voltage level at the second junction.

7. The apparatus set forth in claim 6 together with means for operating the oscillator at one or the other of two different frequencies comprising
- means for selectively setting the time constant of the integrator circuit at either one of two selected different values.

8. The combination set forth in claim 6 together with means for operating the oscillator at one or the other of two different frequencies comprising
- an additional resistor having one end thereof connected to said first junction;
- means for applying the same voltage level to the other end of the additional resistor as is applied to the input terminal of the integrator and voltage divider; and
- means for selectively rendering the last-mentioned means alternatively effective or ineffective.

9. Apparatus for producing sinusoidal signals comprising
- a power supply having a plurality of reference voltage terminals;
- an integrator circuit including an input terminal and a first resistor and a capacitor connected between the input terminal and one of the reference voltage terminals;
- a voltage divider including second and third resistors connected between said input terminal and one of the reference voltage terminals;
- a differential amplifier having a pair of input terminals, one of which is connected to a first junction between the first resistor and capacitor and the other of which is connected to a second junction between the second and third resistors, and operable in two different states in accordance with the relative levels and polarities of the voltages at the two said junctions;
- a switch controlled in accordance with the state of the differential amplifier to apply to said input terminal one or the other of two voltage levels which are respectively higher and lower than the reference voltage connected to the voltage divider to cause the first junction to charge positively and negatively in alternate fashion toward the momentary voltage level at the second junction to produce a triangular voltage waveform at the first junction; and
- a filter coupled to the first junction and including a pair of oppositely poled diodes normally biased to low impedance regions for producing generally sinusoidal output signals in response to the triangular voltage waveform.

10. The apparatus set forth in claim 9 together with means for operating the apparatus at one or the other of two different frequencies comprising
- means for selectively setting the time constant of the integrator circuit at either one of two selected different values.

11. The apparatus set forth in claim 9 together with means for operating the apparatus at one or the other of two different frequencies comprising
- an additional resistor having one end thereof connected to the said first junction;
- means for applying the same voltage level to the other end of the additional resistor as is applied to the input terminal of the integrator and voltage divider; and
- means for selectively rendering the last-mentioned means alternatively effective or ineffective.

12. The apparatus of claim 9 together with
- means adapted to receive start signals for turning on the apparatus and to receive stop signals;
- a limiter responsive to the sinusoidal signals for producing square wave signals; and
- said last-mentioned means responsive to a change in the square wave signal from one of its levels to the other subsequent to the receipt of a stop signal for turning the apparatus off.

13. In apparatus for transmitting and receiving data in the form of carrier frequency signals, the combination comprising
- a transmission line having a predetermined characteristic impedance;
- a carrier signal producing circuit having an output impedance not substantially greater than a few ohms;
- a transformer having a first winding coupled to the output of said circuit and having a second winding;
- said transformer characterized at the carrier frequencies by a maximum inductive impedance substantially greater than the resistive impedance reflected into the second winding by said output impedance but substantially less than the line impedance; and series resistance means connecting the second winding of the transformer to the line and having an impedance not substantially less than the characteristic impedance of the line.

14. In apparatus for transmitting and receiving data in the form of carrier frequency signals, the combination comprising a transmission line having a predetermined characteristic impedance;

a carrier signal receiving and amplifying circuit having an input impedance not substantially greater than a few ohms;

a transformer having a first winding coupled to the input of said circuit and having a second winding;

said transformer characterized at the carrier frequencies by a maximum inductive impedance substantially greater than the resistive impedance reflected into the second winding by said input impedance but substantially less than the line impedance; and series resistance means connecting the second winding of the transformer to the line and having an impedance not substantially less than the characteristic impedance of the line.

15. In apparatus for transmitting and receiving data in the form of audio frequency signals, the combination comprising a transmission line having a predetermined characteristic impedance;

a carrier signal producing circuit having an output impedance not substantially greater than a few ohms;

a transformer having a first winding coupled to the output of said circuit and having a second winding;

said transformer characterized at audio frequencies by a maximum inductive impedance substantially greater than the resistive impedance reflected into the second winding by said output impedance but substantially less than the line impedance; and series resistance means connecting the second winding of the transformer to the line and having an impedance substantially greater than the characteristic impedance of the line.

16. In apparatus for transmitting and receiving data in the form of audio frequency signals, the combination comprising a transmission line having a predetermined characteristic impedance;

a carrier signal receiving and amplifying circuit having an input impedance not substantially greater than a few ohms;

a transformer having a first winding coupled to the input of said circuit and having a second winding;

said transformer characterized at audio frequencies by a maximum inductive impedance substantially greater than the resistive impedance reflected into the second winding by said input impedance but substantially less than the line impedance; and series resistance means connecting the second winding of the transformer to the line and having an impedance substantially greater than the characteristic impedance of the line.

17. A transmission line driver-terminator circuit comprising a source of carrier signals;

a transformer having first and second windings and characterized at carrier frequencies by a maximum inductive impedance which is substantially less than the characteristic impedance of the line.

series resistance means connecting the first winding of the transformer to the line and having an impedance not substantially less than the characteristic impedance of the line; and a shunt feedback amplifier responsive to the carrier signals and having a first output connected to the second winding for producing corresponding signals on the line;

said amplifier including a second output and responsive to carrier signals coupled from the line to the first output by the transformer for producing corresponding signals at the second output.

18. A transmission line driver-terminator circuit comprising a source of audio frequency carrier signals;

a transformer having first and second windings and characterized at the audio frequencies by a maximum inductive impedance which is substantially less than the characteristic impedance of the line;

series resistance means connecting the first winding of the transformer to the line and having an impedance not substantially less than the characteristic impedance of the line; and a shunt feedback amplifier responsive to the carrier signals and having a first output connected to the second winding for producing corresponding signals on the line;

said amplifier including a second output and responsive to carrier signals coupled from the line to the first output by the transformer for producing corresponding signals at the second output.

19. A transmission line driver-terminator circuit comprising a source of carrier signals;

a transformer having first and second windings and characterized at carrier frequencies by a maximum inductive impedance which is substantially less than the characteristic impedance of the line;

series resistance means connecting the first winding of the transformer to the line and having an impedance substantially greater than the characteristic impedance of the line; and a shunt feedback amplifier responsive to the carrier signals and having a first output connected to the second winding for producing corresponding signals on the line;

said amplifier including a second output and responsive to carrier signals coupled from the line to the first output by the transformer for producing corresponding signals at the second output.

20. A transmission line driver-terminator circuit comprising a source of audio frequency carrier signals;

a transformer having first and second windings and characterized at the audio frequencies by a maximum inductive impedance which is substantially less than the characteristic impedance of the line;

series resistance means connecting the first winding of the transformer to the line and having an impedance substantially greater than the characteristic impedance of the line; and a shunt feedback amplifier responsive to the carrier signals and having a first output connected to the second winding for producing corresponding signals on the line;

said amplifier including a second output and responsive to carrier signals coupled from the line to the first output by the transformer for producing corresponding signals at the second output.

21. A circuit for driving and terminating a transmission line comprising a source of carrier signals;

a transformer having first and second windings and characterized by an inductive impedance at audio frequencies which is a small fraction of the characteristic impedance of the line;

series resistance means connecting the first winding to the line and having an impedance not substantially less than the characteristic impedance of the line;

a feedback resistor;

a shunt feedback amplifier connected to the source and including an input transistor with base and collector electrodes and a pair of output transistors operated in push-pull manner with their base electrodes connected to the collector electrode of the input transistor and their emitter electrodes connected by the feedback resistor to the base electrode of the input transistor;

means connecting the second winding to the emitter electrodes to produce carrier signals on the line in response to signals from the source and to produce carrier signals at the collector electrodes of the push-pull transistors at least in response to signals received from the line.

22. A circuit for driving and terminating a transmission line comprising a source of carrier signals;

a transformer having first and second windings and characterized by an inductive impedance at audio frequencies which is a small fraction of the characteristic impedance of the line;

series resistance means connecting the first winding to the line and having an impedance substantially greater than the characteristic impedance of the line;

a feedback resistor;

a shunt feedback amplifier connected to the source and including an input transistor with base and collector electrodes and a pair of output transistors operated in push-pull manner with their base electrodes connected to the collector electrode of the input transistor and their emitter electrodes connected by the feedback resistor to the base electrode of the input transistor;

means connecting the second winding to the emitter electrodes to produce carrier signals on the line in response to signals from the source and to produce carrier signals at the collector electrodes of the push-pull transistors at least in response to signals received from the line.

23. A circuit for driving and terminating a transmission line comprising a source of carrier signals;

a transformer having first and second windings and characterized by an inductive impedance at carrier frequencies which is a small fraction of the characteristic impedance of the line;

series resistance means connecting the first winding to the line and having an impedance not substantially less than the characteristic impedance of the line;

a feedback resistor;

a shunt feedback amplifier connected to the source and including an input transistor with base and collector electrodes and a pair of output transistors operated in push-pull manner with their base electrodes connected to the collector electrode of the input transistor and their emitter electrodes connected by the feedback resistor to the base electrode of the input transistor;

means connecting the second winding to the emitter electrodes to produce carrier signals on the line in response to signals from the source and to produce carrier signals at the collector electrodes of the push-pull transistors at least in response to signals received from the line.

24. A circuit for driving and terminating a transmission line comprising a source of carrier signals;

a transformer having first and second windings and characterized by an inductive impedance at audio frequencies which is a small fraction of the characteristic impedance of the line;

series resistance means connecting the first winding to the line and having an impedance not substantially less than the characteristic impedance of the line;

a feedback resistor;

a shunt feedback amplifier connected to the source and including an input transistor with base and collector electrodes and a pair of output transistors operated in push-pull manner with their base electrodes connected to the collector electrode of the input transistor and their emitter electrodes connected by the feedback resistor to the base electrode of the input transistor;

means connecting the second winding to the emitter electrodes to produce carrier signals on the line in response to signals from the source and to produce carrier signals at the collector electrodes of the push-pull transistors in response to signals received from the line and from the source.

References Cited

UNITED STATES PATENTS 3,371,291 2/1968 Forrest et al. ------ 332—14 X

ROBERT L. GRIFFIN, *Primary Examiner.*

J. A. BRODSKY, *Assistant Examiner.*

U.S. Cl. X.R.

325—30, 163; 331—111

UNITED STATES PATENT OFFICE
CERTIFICATE OF CORRECTION

Patent No. 3,432,616 March 11, 1969

William G. Crouse

It is certified that error appears in the above identified patent and that said Letters Patent are hereby corrected as shown below:

Column 3, line 54, "invention" should read -- application --. Column 4, line 62, "appaartus" should read -- apparatus --; line 74, "date" should read -- data --. Column 5, line 39, cancel "and". Column 6, line 69, "potential" should read -- potentials --. Column 10, line 33, "tht" should read -- the --; line 41, "wavtform" should read -- waveform --; line 55, "fgorm" should read -- form --. Column 11, line 46, "connecttd" should read -- connected --; line 66, "resistor" should read -- resistors --. Column 13, line 69, "transmiting" should read -- transmitting --. Column 17, line 19, "337" should read -- 367 --. Column 20, line 58, "requency" should read -- frequency --. Column 22, line 5, "switches when the output of the low pass filter" should read -- would be biased in such a way so it would tend --. Column 23, line 74, "fo" should read -- of --. Column 24, line 49, "to" should read -- by --. Column 27, line 34, after "little" insert -- current --. Column 30, line 35, "4.580" should read -- 4,580 --. Column 31, line 2, "pases" should read -- passes --; line 7, "798" should read -- 708 --; line 27, "side" should read -- state --. Column 34, line 26, cancel "the", third occurrence; line 42, "current" should read -- currents --. Column 35, line 35, after "provide" insert -- greater --; line 36, "embodiments" should read -- embodiment --. Column 39, line 69, "line." should read -- line, --. Column 42, after line 42, insert:

| | | | |
|---|---|---|---|
| 2,409,474 | 10/1946 | Clapp --------------- | 333-24 X |
| 2,669,697 | 2/1954 | Olesen -------------- | 333-24 |
| 2,879,412 | 3/1959 | Hoge et al. --------- | 331-113 X |
| 2,894,215 | 7/1959 | Toy | |
| 2,924,788 | 2/1960 | Maurushat, Jr. ------ | 332-14 |
| 3,037,078 | 5/1962 | Higgins et al. ------ | 331-113 X |

Signed and sealed this 14th day of April 1970.

(SEAL)
Attest:

EDWARD M.FLETCHER,JR.
Attesting Officer

WILLIAM E. SCHUYLER, JR.
Commissioner of Patents

UNITED STATES PATENT OFFICE
CERTIFICATE OF CORRECTION

Patent No. 3,432,616 March 11, 1969

William G. Crouse

It is certified that error appears in the above identified patent and that said Letters Patent are hereby corrected as shown below:

Column 3, line 54, "invention" should read -- application --. Column 4, line 62, "appaartus" should read -- apparatus --; line 74, "date" should read -- data --. Column 5, line 39, cancel "and". Column 6, line 69, "potential" should read -- potentials --. Column 10, line 33, "tht" should read -- the -- line 41, "wavtform" should read -- waveform --; line 55, "fgorm" should read -- form --. Column 11, line 46, "connecttd" should read -- connected --; line 66, "resistor" should read -- resistors --. Column 13, line 69, "transmiting" should read -- transmitting --. Column 17, line 19, "337" should read -- 367 --. Column 20, line 58, "requency" should read -- frequency --. Column 22, line 5, "switches when the output of the low pass filter" should read -- would be biased in such a way so it would tend --. Column 23, line 74, "fo" should read -- of --. Column 24, line 49, "to" should read -- by --. Column 27, line 34, after "little" insert -- current --. Column 30, line 35, "4.580" should read -- 4,580 --. Column 31, line 2, "pases" should read -- passes --; line 7, "798" should read -- 708 --; line 27, "side" should read -- state --. Column 34, line 26, cancel "the", third occurrence; line 42, "current" should read -- currents --. Column 35, line 35, after "provide" insert -- greater -- line 36, "embodiments" should read -- embodiment --. Column 39, line 69, "line." should read -- line, --. Column 42, after line 42, insert:

| | | | |
|---|---|---|---|
| 2,409,474 | 10/1946 | Clapp --------------- | 333-24 X |
| 2,669,697 | 2/1954 | Olesen -------------- | 333-24 |
| 2,879,412 | 3/1959 | Hoge et al. --------- | 331-113 X |
| 2,894,215 | 7/1959 | Toy | |
| 2,924,788 | 2/1960 | Maurushat, Jr. ------ | 332-14 |
| 3,037,078 | 5/1962 | Higgins et al. ------ | 331-113 X |

Signed and sealed this 14th day of April 1970.

(SEAL)
Attest:

EDWARD M.FLETCHER,JR.
Attesting Officer

WILLIAM E. SCHUYLER, JR.
Commissioner of Patents